United States Patent
Deboy et al.

(10) Patent No.: US 9,825,531 B2
(45) Date of Patent: Nov. 21, 2017

(54) POST-REGULATED FLYBACK CONVERTER WITH VARIABLE OUTPUT STAGE

(71) Applicant: Infineon Technologies Austria AG, Villach (AT)

(72) Inventors: Gerald Deboy, Klagenfurt (AT); Anthony Sanders, WeiBenfeld (DE)

(73) Assignee: Infineon Technologies Austria AG, Villach (AT)

( * ) Notice: Subject to any disclaimer, the term of this patent is extended or adjusted under 35 U.S.C. 154(b) by 189 days.

(21) Appl. No.: 13/939,015

(22) Filed: Jul. 10, 2013

(65) Prior Publication Data
US 2015/0015071 A1  Jan. 15, 2015

(51) Int. Cl.
*H02M 3/335* (2006.01)
*H02M 3/28* (2006.01)

(52) U.S. Cl.
CPC ......... *H02M 3/335* (2013.01); *H02M 3/285* (2013.01); *H02M 3/33507* (2013.01);
(Continued)

(58) Field of Classification Search
CPC .......... H02M 3/22; H02M 3/28; H02M 3/325; H02M 3/335; H02M 3/33507; H02M 3/33515; H02M 3/33523; H02M 3/3353; H02M 3/33538; H02M 3/33546; H02M 3/33569; H02M 3/33576; H02M 3/33584; H02M 3/33592; H02M 1/4258; H02M 7/217; H02M 3/285; Y02B 70/10; Y02B 70/14; Y02B 70/1458; Y02B 70/1475; Y10T 307/406

USPC ........... 363/15–26, 40, 41, 50, 55–56.11, 79, 363/95–98, 131–134; 323/205–211, 323/271–276, 282–287, 299–303, 351; 307/31, 38–41; 713/300–340
See application file for complete search history.

(56) References Cited

U.S. PATENT DOCUMENTS 5,933,049 A * 8/1999 Melse ........................ 363/21.13
5,991,171 A * 11/1999 Cheng ........................ 363/21.03
(Continued)

FOREIGN PATENT DOCUMENTS

CN  1381942 A  11/2002
DE  3210568 A1  2/1984
(Continued)

OTHER PUBLICATIONS

English translation of DE 3210568.*
(Continued)

*Primary Examiner* — Timothy J Dole
*Assistant Examiner* — Carlos Rivera-Perez
(74) *Attorney, Agent, or Firm* — Shumaker & Sieffert, P.A.

(57) ABSTRACT

A power circuit is described that includes a transformer arranged to store energy. The power circuit further includes a parallel switch device arranged in parallel to a secondary side winding of the transformer, an output port coupled to a device and the secondary side winding of the transformer, and a control unit. The control unit is configured to receive, from the device, information indicative of a required voltage associated with the device, and control, based on the information, the parallel switch device to generate, based on an amount of energy stored at the transformer, the required voltage as an output voltage at the output port.

34 Claims, 12 Drawing Sheets

(52) U.S. Cl.
CPC ..... *H02M 3/33592* (2013.01); *Y02B 70/1475* (2013.01); *Y10T 307/406* (2015.04)

(56) References Cited

U.S. PATENT DOCUMENTS

| | | | |
|---|---|---|---|
| 6,549,432 | B1 | 4/2003 | Giannopoulos et al. |
| 6,606,257 | B2 | 8/2003 | Bourdillon |
| 6,674,658 | B2 | 1/2004 | Mao et al. |
| 7,158,392 | B2* | 1/2007 | Hosokawa et al. ........ 363/21.06 |
| 2003/0086280 | A1 | 5/2003 | Bourdillon |
| 2004/0037100 | A1* | 2/2004 | Orr et al. ...................... 363/131 |
| 2007/0030716 | A1* | 2/2007 | Manolescu ........... H02M 3/157 363/84 |
| 2009/0086512 | A1* | 4/2009 | Fahlenkamp ..... H02M 3/33592 363/21.06 |
| 2010/0283322 | A1 | 11/2010 | Wibben |
| 2012/0327695 | A1* | 12/2012 | Fischer ............... H02M 1/4208 363/74 |
| 2013/0250624 | A1* | 9/2013 | Fornage ............. H02M 7/4807 363/17 |
| 2013/0336016 | A1* | 12/2013 | Shiji ................. H02M 3/33507 363/21.02 |
| 2014/0254208 | A1* | 9/2014 | Dai et al. ................... 363/21.02 |

FOREIGN PATENT DOCUMENTS

| | | |
|---|---|---|
| DE | 69605530 T2 | 7/2000 |
| EP | 0464246 A1 | 1/1992 |
| EP | 1837985 A2 | 9/2007 |

OTHER PUBLICATIONS

Shin et al., "Bridgeless Isolated PFC Rectifier Using Bidirectional Switch and Dual Output Windings," IEEE conference in Phoenix, AZ, Sep. 17-22, 2011, published in Energy Conversion Congress and Exposition, 2011 IEEE, pp. 2879-2884.

Office Action, in the Chinese language, from counterpart Chinese Application No. 20141032947.0, dated Jun. 20, 2016, 18 pp.

Office Action, in the German language, from counterpart Germany Application No. 20141032947.0, dated Feb. 9, 2015, 8 pp.

Office Action, in the Chinese language, from counterpart Chinese Application No. 201410329467.0, dated Mar. 20, 2017, 18 pp.

\* cited by examiner

POST-REGULATED FLYBACK CONVERTER WITH VARIABLE OUTPUT STAGE

TECHNICAL FIELD

This disclosure relates to power converters, and more particular, to techniques for regulating the output stage of a flyback-based power converter.

BACKGROUND

Power converters are widely used in electronics to convert an electrical input voltage from a source to a suitable amount of output voltage at a destination load. In addition, power converters may convert an AC voltage to a DC voltage since electronic devices often require DC power. For example, a power converter may convert a voltage from a main power grid (e.g., accessed from an AC power plug from a wall socket) to an appropriate amount of DC voltage and/or current for powering an electronic device (e.g., a laptop, a mobile phone, etc.).

Power converters may have certain drawbacks. One drawback is that different electronic devices may have different voltage requirements and a single power converter may not satisfy all of the requirements of all the different devices. For instance, a laptop computer may require a higher amount of power (e.g., sixty watts) during operation than the amount of power required by a mobile phone (e.g., ten watts). The power converter used to operate the mobile phone may not provide a sufficient amount of voltage to operate the laptop and the power converter used to operate the laptop may provide too much voltage and overpower the mobile phone. A further drawback is that the physical size of a converter may vary depending on the power requirements of a destination device. For instance, since a laptop may generally require a larger amount of voltage, the electronic circuitry in a laptop power converter may be larger and more complex than the electronic circuitry found in a suitable converter (e.g., a "plug-size" adapter) used to charge a mobile phone. Another drawback of power converters is that some converters only have single output port capability, that is, a single output port converter can only provide an amount of voltage to one device at a time. Even if a converter provides multiple output ports, a multiple output port converter may only provide simultaneous and equal amounts of voltage to multiple devices that share the same voltage requirements.

SUMMARY

In general, techniques and circuits are described for regulating an output voltage at one or more output ports of a flyback converter-based power converter. The power converter includes an input port coupled to the primary side windings of one or more transformers and one or more output ports coupled to the secondary side windings of the one or more transformers. One or more parallel switch devices arranged in parallel to the secondary side windings of the one or more transformers can be controlled to regulate and/or adjust the amount of energy transferred from the one or more transformers to each of the one or more output ports.

In one example, the disclosure is directed to a power circuit that includes a transformer arranged to store energy. The transformer has a primary side winding and a secondary side winding. The power circuit also includes a parallel switch device arranged in parallel to the secondary side winding of the transformer.

In another example, the disclosure is directed to a method that includes receiving an input voltage at an input port coupled to a primary side winding of a transformer of a power circuit. The method further includes controlling a primary switch arranged in series between the input port and the primary side winding to store an amount of energy at the transformer based on the input voltage. The method further includes controlling a parallel switch device arranged in parallel to the secondary winding of the transformer to regulate an output voltage or an output current at an output port coupled to the secondary side winding of the transformer.

In one example, the disclosure is directed to a device having means for receiving an input voltage at an input port coupled to a primary side winding of a transformer. The device further includes means for controlling a primary switch arranged in series between the input port and the primary side winding to store an amount of energy at the transformer based on the input voltage. The device further includes means for controlling a parallel switch device arranged in parallel to the secondary winding of the transformer to regulate an output voltage or an output current at an output port coupled to the secondary side winding of the transformer. The details of one or more examples are set forth in the accompanying drawings and the description below. Other features, objects, and advantages of the disclosure will be apparent from the description and drawings, and from the claims.

DETAILED DESCRIPTION

Figure 1:
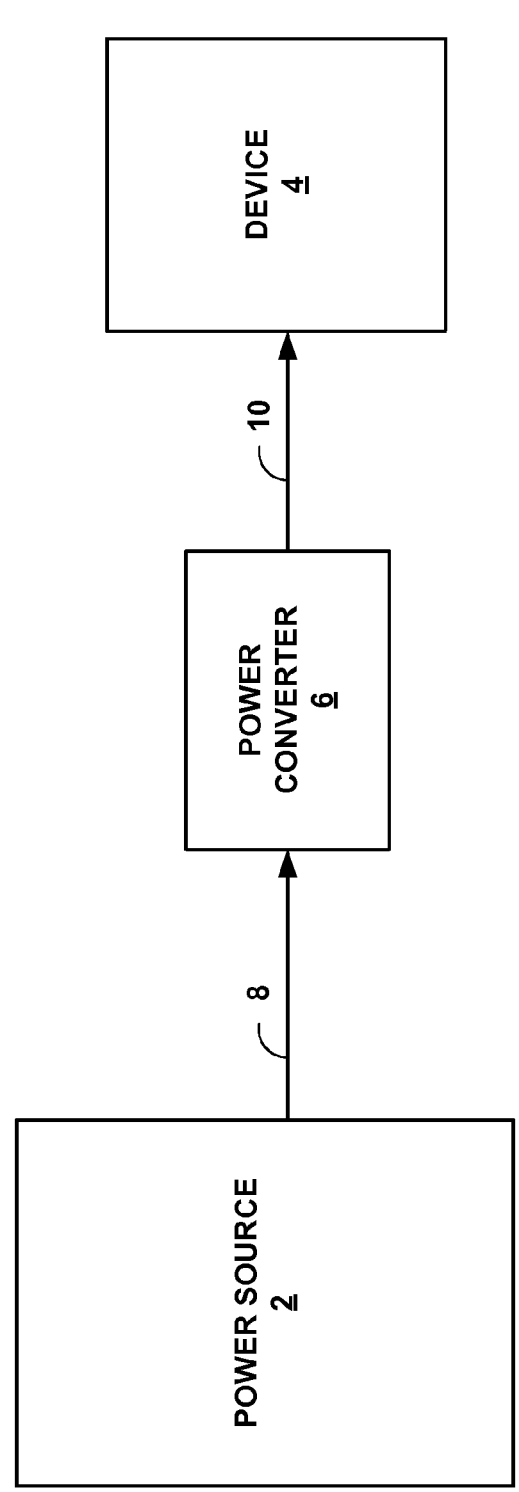
FIG. 1 is a conceptual diagram illustrating an example system for converting power from a power source, in accordance with one or more aspects of the present disclosure.

In some power converter applications, for example, where the required power output is on the order of seventy-five watts, a flyback converter-based power converter may provide a versatile and cost effective solution for the application's power conversion needs. The flyback converter-based power converter may drive current either in discontinuous conduction mode (DCM), continuous conduction mode (CCM), or multi-mode operation. Zero or low voltage switching on the primary side of the flyback converter-based power converter may be achieved through passive resonance of a leakage inductance of a transformer that has a capacitance equivalent to the primary side switching element or by transferring energy actively from the secondary side of the flyback converter-based power converter back to the primary side.

Some flyback converter-based power converters may be capable of providing multiple output voltage levels by controlling the duty cycle of the primary side switch (e.g., the primary side duty cycle). However at high switching frequency, regulation accuracy of the output voltage may degrade. For example, a sixty watt flyback converter-based power converter running at two hundred kilo hertz frequency with multiple output voltages (e.g., twenty volts, twelve volts, five volts, and the like) may have a regulation accuracy of approximately two percent.

In addition, some flyback converter-based power converters that provide multiple output voltage levels may have only one secondary winding. Drawbacks of the single secondary side winding flyback converter are that the transformer ratio between the primary side winding and the single secondary side winding is based on the maximum output voltage that the flyback converter supports. In other words, the primary side winding of the transformer is set according to the maximum voltage supported by the flyback converter. These forms of flyback converters may experience short "turn on" times and long "turn off" times. Furthermore, a change in the primary side duty cycle (e.g. by one nano second) can proportionately and adversely change the output voltage (e.g., by two percent), and as such, regulation accuracy is also low.

A post regulation buck converter may be added to a wide variety of flyback converters to increase regulation accuracy. However the post regulation buck converter adds a second magnetic element (e.g. an output choke). The second magnetic element increases the amount of physical space and/or packaging of the power converter and may also adversely increase power density and may not be suitable for applications that require a compact, e.g. plug-size adapter.

Some flyback converter-based power converters may support multiple output voltages and/or multiple output ports by having multiple secondary side windings. Each secondary winding may support a different output voltage at a different output port. Drawbacks of the multiple secondary side windings are that cross coupling between the secondary side windings may occur and that multiple secondary side windings do not provide a single port and multiple output voltage level power converter. When power is drawn from a winding at one output port, power may also transfer from the other windings to the other output ports. In other words, the output voltage at each port cannot be precisely regulated, especially if only one output port is coupled to a load while the other output ports are uncoupled (or have a zero amount of load). This type of flyback converter may not support some applications that require multiple output voltages at individual ports (e.g., a one port Universal Serial Bus (USB) application that needs to support voltages ranging from five to twenty volts).

The flyback converter-based power converter, alone or in combination with a post regulation buck converter, may not provide a one or more port and a multiple output voltage power converter solution with high regulation accuracy, in some cases, greater than ten watt output, and also fit within the size and weight requirements of some compact plug-size adapters. As such these power converters may not be suitable for powering both a laptop computer (which may require different voltage levels greater than ten watts) and some mobile phones (that may require less than ten watts).

In general, techniques and circuits are described for regulating an output voltage at one or more respective output ports of a flyback converter-based power converter. This power converter includes one or more modified flyback converter units. Unlike other flyback converter units, each of the one or more modified flyback converter units includes "post-regulation" circuitry. Each of the modified flyback converter units includes a parallel switch device arranged in parallel to a secondary side winding of a transformer arranged to store energy. By controlling the one or more parallel switch devices of the power converter in accordance with these techniques, the power converter can regulate the output voltage at one or more output ports with higher regulation accuracy than some flyback converter-based power converters.

In some examples, the power converter may comprise a single or multi-port power converter and provide either a single and/or multi-level output voltage at each port. That is, whether the power converter has one or more output ports, the power converter according to these techniques and circuits may simultaneously provide independent and/or variable output voltage levels at each output port. The power converter may provide one variable level voltage at one output port while simultaneously providing a different variable level voltage at a different output port.

In some examples, the power converter may automatically (e.g., without user intervention) detect an amount of load at an output port and adjust the output voltage accordingly based on the amount of load. For instance, the power converter can provide a 20V/3 A output when the power converter detects one amount of load (e.g., when connected to a laptop computer) and provide a 5V/1 A output when the power converter detects a different amount of load (e.g., when connected to a mobile phone).

By utilizing one or more modified flyback converter units according to these techniques and circuits, the power converter can be used in high performance (e.g., high switching frequency) applications that require higher voltage regulation accuracy than the voltage regulation accuracy that other flyback converter-based power converters can provide. In addition, a single power converter may be suitable for multiple applications that require differing and conflicting voltage requirements. Furthermore, the power converter according to these techniques and circuits can provide a large amount of power (e.g., greater than ten watts) and still fit within a smaller (e.g., plug-sized) package usually reserved for less powerful (e.g., less than ten watts) power converters.

FIG. 1 is a conceptual diagram illustrating system 1 for converting power from power source 2, in accordance with one or more aspects of the present disclosure. FIG. 1 shows system 1 as having three separate and distinct components shown as power source 2, power converter 6, and device 4, however system 1 may include additional or fewer components. For instance, power source 2, power converter 6, and device 4 may be three individual components or may represent a combination of one or more components that provide the functionality of system 1 as described herein.

System 1 includes power source 2 which provides electrical energy (i.e., power) to system 1. Numerous examples of power source 2 exist and may include, but are not limited to, power grids, generators, power transformers, batteries, solar panels, windmills, degenerative braking systems, hydro electrical generators, AC sources, DC sources, or any other form of electrical power devices capable of providing electrical energy (e.g., a voltage, a current, etc.) to system 1.

System 1 includes power converter 6 which converts electrical energy provided by power source 2 into a usable form of electrical power for device 4. Examples of power converter 6 include, but are not limited to, stationary and portable power adapters, DC/DC converters, AC/DC converters, plug sized converters, and the like.

System 1 includes device 4 which receives electrical power converted by power converter 6 and in some examples, uses the electrical power to perform a function. Numerous examples of device 4 exist and may include, but are not limited to, computing devices, such as laptop computers, desktop computers, tablet computers, mobile phones, and the like, battery chargers, light fixtures, televisions, appliances, machinery, automotive electrical systems, laboratory test systems, or any other type of electrical device and/or circuitry that receives electrical power from a power converter.

Power source 2 may provide electrical energy over link 8 and device 4 may receive electrical power converted by power converter 6 over link 10. Links 8 and 10 represent any medium capable of conducting electrical energy from one location to another. Examples of links 8 and 10 include, but are not limited to, physical and/or wireless electrical transmission mediums such as electrical wires, electrical traces, conductive gas tubes, twisted wire pairs, and the like. Link 10 provides electrical coupling between power converter 6 and device 4 and link 8 provides electrical coupling between power source 2 and power converter 6. Device 4 is electrically coupled to power converter 6 which is electrically coupled to power source 2.

In the example of system 1, the electrical power generated by power source 2 is converted to a suitable form of electrical energy for use by device 4. For instance, power source 2 may output, and power converter 6 may receive, an electrical voltage and/or current at link 8. Power converter 6 may convert the received voltage and/or current to a suitable form of electrical energy required by device 4. Power converter 6 may output, and device 4 may receive the converted voltage and/or current at link 10. Device 4 may use the converted voltage and/or current to perform a function.

Figure 2:
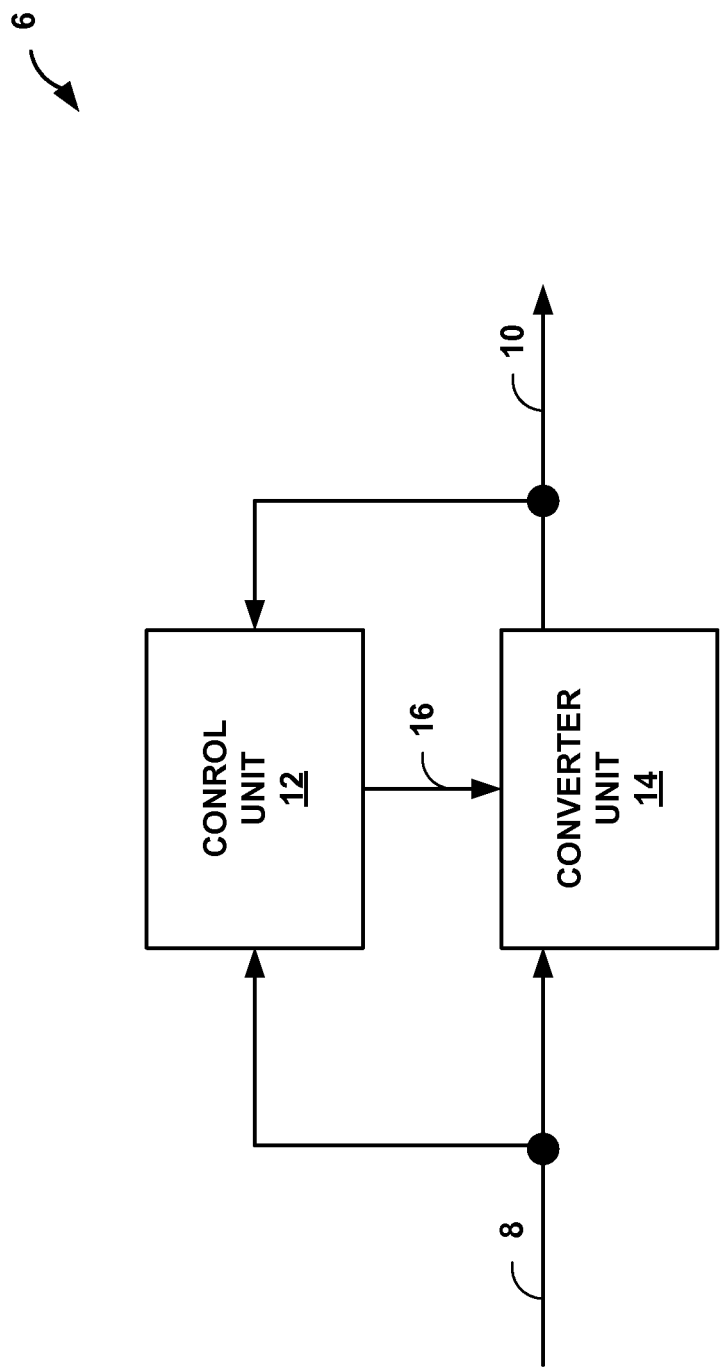
FIG. 2 is a conceptual diagram illustrating one example of a power converter of the example system shown in FIG. 1.

FIG. 2 is a conceptual diagram illustrating one example of power converter 6 of system 1 shown in FIG. 1. For instance, FIG. 2 shows a more detailed exemplary view of power converter 6 of system 1 from FIG. 1 and the electrical connections to power source 2 and device 4 provided by links 8 and 10 respectively.

Power converter 6 is shown as having two electrical components, control unit 12 and converter unit 14, that power converter 6 uses to convert electrical power received via link 8 to a different form or magnitude of electrical energy that power converter 6 outputs at link 10. Power converter 6 may include more or fewer electrical components. For instance, in some examples, control unit 12 and converter unit 14 are a single electrical component or circuit while in other examples, more than two components and/or circuits provide power converter 6 with the functionality of control unit 12 and converter unit 14.

Converter unit 14 represents a primary switched power conversion circuit of power converter 6 that also provides isolation between an input voltage and/or current received at an input port coupled to link 8 and one or more reciprocal output voltages and/or currents transmitted at one or more output ports coupled to link 10. Converter unit 14 is described in more detail below, however in general, converter unit 14 may receive an input voltage and/or current at a connection (e.g., an input port) coupled to link 8. Converter unit 14 may transmit an output voltage and/or current, based at least in part on the input voltage and/or current, at a different connection (e.g., an output port) coupled to link 10. Converter unit 14 may receive one or more control commands or signals from control unit 12 via link 16 that control at what time and in what form or magnitude of output voltage that converter unit 14 provides at link 10.

Converter unit 14 may include one or more flyback converter units that further include one or more switches, capacitors, resistors, diodes, transformers, and/or other electrical components, elements, or circuits that are arranged within converter unit 14 to provide an output voltage at link 10 based on an input voltage at link 8. For example, converter unit 14 may include one or more transformers that each have a primary side winding and a secondary side winding. In addition, converter unit 14 may include one or more primary switches and/or one or more parallel switch devices that control whether the transformer is storing energy received over link 8 or whether the transformer is outputting the stored energy to link 10.

Control unit 12 of power converter 6 may provide command and control signals to converter unit 14 via link 16 to control at what time and in what form or magnitude of output voltage that converter unit 14 provides at link 10. Control unit 12 may provide command and control signals based on an input voltage and/or current at link 8 and an output voltage, current, and/or amount of load measured at link 10. In other words, control unit 12 may provide power converter 6 with feedback control circuitry that power converter 6 may use to adjust the output voltage and/or current generated by converter unit 14 at link 10, based on the voltage, current, and/or amount of load measured at links 8 and 10. For example, control unit 12 may provide electrical signals or commands over link 16 to control one or more primary switches, parallel switch devices, and/or secondary elements of converter unit 14. In response to the voltages, currents, and/or amounts of load at links 8 and 10, control unit 12 may adjust the one or more primary switches, parallel switch devices, and/or secondary elements of converter unit 14 to alter the current and/or magnitude of the output voltage at link 10.

Control unit 12 can comprise any suitable arrangement of hardware, software, firmware, or any combination thereof, to perform the techniques attributed to control unit 12 herein. For example, control unit 12 may include any one or more microprocessors, digital signal processors (DSPs), application specific integrated circuits (ASICs), field programmable gate arrays (FPGAs), or any other equivalent integrated or discrete logic circuitry, as well as any combinations of such components. When control unit 12 includes software or firmware, control unit 12 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components. Although not shown in FIG. 2, control unit 12 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to control unit 12 and/or power converter 6, e.g., may be external to a package in which control unit 12 and/or power converter 6 is housed.

Figure 3:
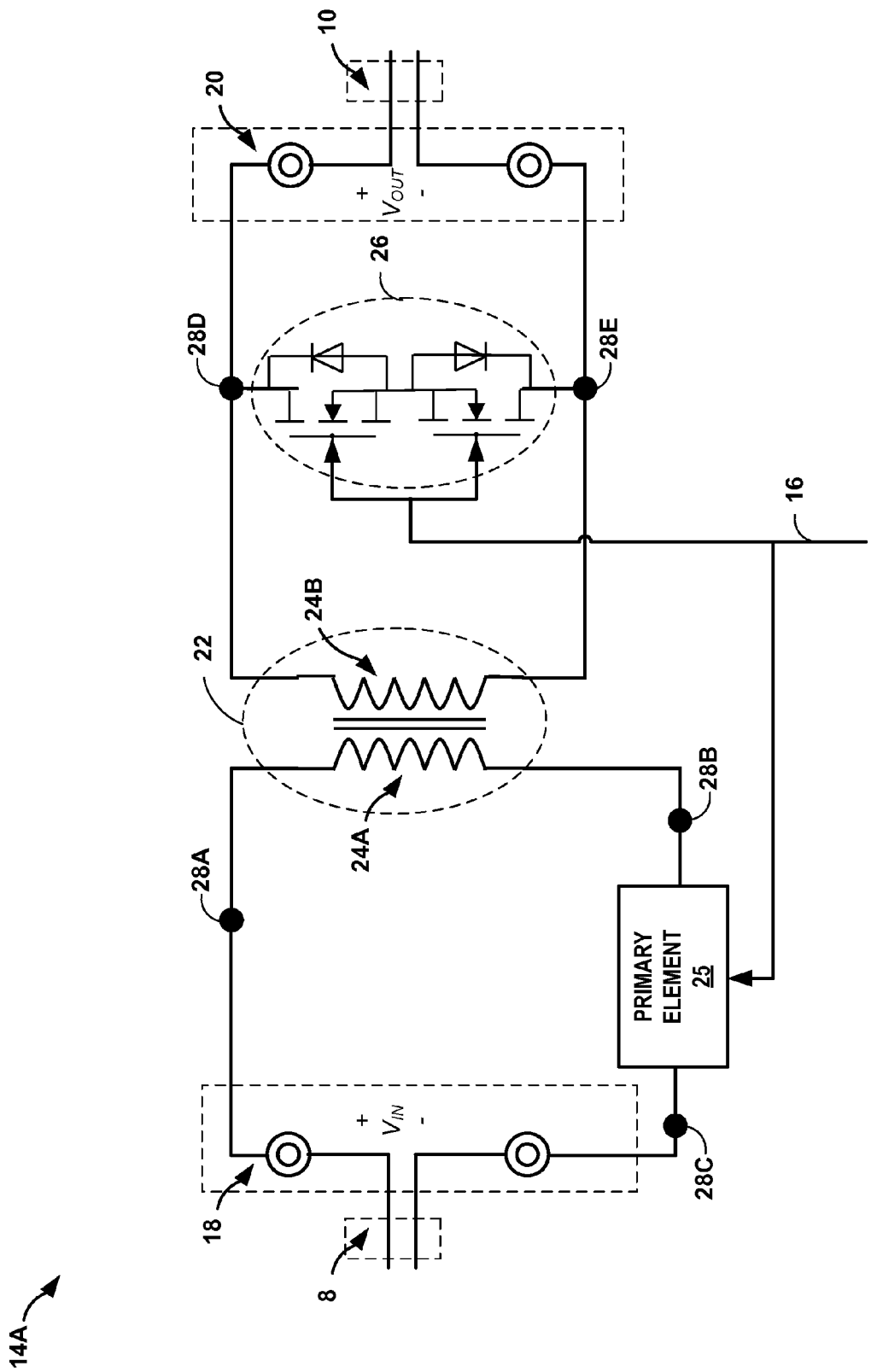
FIG. 3 is a conceptual diagram illustrating an example converter unit for providing a regulated output voltage or a regulated output current, in accordance with one or more aspects of the present disclosure.

FIG. 3 is a conceptual diagram illustrating converter unit 14A for providing a regulated output voltage or a regulated output current, in accordance with one or more aspects of the present disclosure. For instance, FIG. 3 shows a more detailed exemplary view of converter unit 14 of power converter 6 from FIG. 2. Converter unit 14A of FIG. 3 includes one or more electrical components that are arranged and interconnected at connections 28A, 28B, 28C, 28D, and 28E (collectively "connections 28"). Each of connections 28 represents an electrical coupling between two or more terminals of components of converter unit 14A.

Converter unit 14A includes input port 18, output port 20, transformer 22, primary element 25, and parallel switch device 26. Converter unit 14A may include additional components, elements, and/or circuits not shown in the illustration of FIG. 3. Input port 18 may be coupled to a voltage source (e.g., power source 2) at link 8 and output port 20 may be coupled to a load (e.g., device 4) at link 10. A first terminal of input port 18 corresponds to connection 28A and a second terminal of input port 18 corresponds to connection 28C. An input voltage $V_{IN}$ generated by power source 2 of system 1, may enter converter unit 14A at input port 18 via link 8 at connections 28A and 28C. A first terminal of output port 20 corresponds to connection 28D and a second terminal of output port 20 corresponds to connection 28E. Converter unit 14A may generate an output voltage $V_{OUT}$ (or in some cases an output current) that may exit converter unit 14A at output port 20 via link 10 at connections 28D and 28E.

Transformer 22 is coupled to input port 18 at connection 28A and, by way of a series connection with primary element 25 at connection 28B, at connection 28C. In other words, primary element 25 may be a switch device (or some other element suitable for causing transformer 22 to store an amount of energy based on the input voltage at input port 18 in accordance with the techniques described herein) arranged in series between input port 18 and transformer 22 and coupled to connection 28C and 28B such that transformer 22 is "coupled" to input port 18 at connections 28A and 28C by way of the series connection that transformer 22 shares with primary element 25 at connection 28B. Transformer 22 is coupled to output port 20 at connections 28D and 28E. Transformer 22 is arranged in-between the input port 18 and output port 20 to store energy. Transformer 22 includes primary side winding 24A and secondary side winding 24B. A first terminal of primary side winding 24A is coupled to a first terminal of input port 18 at connection 28A. A second terminal of primary side winding 24A is coupled, by way of a series connection with primary element 25, to a second terminal of input port 18 at connection 28B. A first terminal of secondary side winding 24B is coupled to a first terminal of output port 20 at connection 28D. A second terminal of secondary side winding 24B is coupled to a second terminal of output port 20 at connection 28E.

Converter unit 14A further includes parallel switch device 26 arranged in parallel to secondary side winding 24A of transformer 22. A first terminal of parallel switch device 26 is coupled to a first terminal of secondary winding 24B at connection 28D and a second terminal of parallel switch device 26 is coupled to a second terminal of secondary winding 24B at connection 28E.

Parallel switch device 26 may include one or more bidirectional blocking switches. FIG. 3 illustrates parallel switch 26 as a bidirectional blocking switch device that includes a first blocking switch (e.g., a one hundred fifty volt MOSFET) arranged in series with a second blocking switch (e.g., a forty volt MOSFET). The first blocking switch may be configured to block a first voltage at a first terminal of parallel switch device 26 and the second blocking switch may be configured to block a second voltage at a second terminal of parallel switch device 26.

In other words, parallel switch device 26 includes two anti-serial switches with gates that can be referenced to the mid potential between the two switches. The anti-serial switch of parallel switch device 26 that is coupled to connection 28D may be configured to block the highest level of output voltage that may occur at output port 20 and may be referred to as the "active" switch that determines whether energy stored at transformer 22 is delivered to output port 20 or not. The other anti-serial switch of parallel switch device 26 that is coupled to connection 28E may be configured to block the input voltage reflected at secondary side winding 24B (e.g., a ration between the input voltage Vin and the winding ratio of transformer 22) and may be referred to as the "synchronous" or "inactive" switch for preventing conduction losses and may not interrupt current flow if "turned off." In some examples, the synchronous switch may be a diode.

In some examples, parallel switch device 26 may include one or more gallium nitride (GaN) based switch devices. For instance, parallel switch device 26 may be a bidirectional blocking and normally-off GaN based switch device with a breakdown voltage of approximately one hundred fifty volts.

Primary element 25 may be any suitable switch device or element suitable for being used in accordance with the techniques described herein to store an amount of energy, based on the input voltage at input port 18, at transformer 22. Many examples of primary element 25 exist. For instance primary element 25 may in some examples be a Silicon (Si), Gallium Nitride (GaN), and/or Silicon Carbide (SiC) based switching device. In some examples, primary element is a unidirectional, or non-bidirectional, switch device. In some examples, primary element 25 may be a normally-off GaN based switch device with a breakdown voltage of approximately seven hundred volts and a resistance of approximately one hundred fifty milliohms. Many other examples of primary element 25 exist and many other combinations of Si, GaN, and SiC based switch devices may be used.

Converter unit 14A may receive one or more commands via link 16 for controlling parallel switch device 26 and in some examples, for controlling primary element 25. For example, converter unit 14A may receive a command from control unit 12 via link 16 that causes parallel switch device 26 and/or primary element 25 to cycle (e.g., to open and/or close). Control unit 12 may be configured to cycle primary element 25 and/or parallel switch device 26 of converter unit 14A to control an output voltage at output port 20. The output voltage may be based on an amount of energy stored at transformer 22.

Converter unit 14A may receive an input voltage at input port 18 coupled to primary side winding 24A of transformer 22. Control unit 12 may provide a command over link 16 to cycle primary element 25 to cause transformer 22 to store energy, based on the input voltage, at an air gap of the core of the transformer 22. Converter unit 14A may provide an output voltage, based on the stored energy, at output port 20 coupled to secondary side winding 24B of transformer 22.

In response to the input voltage received over link 8, control unit 12 may provide a command at link 16 to either open or close parallel switch device 26. Control unit 12 may open parallel switch device 26 to allow the energy stored at transformer 22 to exit converter unit 14A as an output voltage at output port 20. Conversely, control unit 12 may close parallel switch device 26 to prevent the stored energy from exiting at output port 20 and instead cause a freewheeling current path at secondary winding 24B of transformer 22.

Control unit 12 may cycle (e.g., open and close) parallel switch device 26 and utilize the free-wheeling current path at secondary winding 24B to improve the regulation accuracy of the output voltage of converter 14A at output port 20. For instance, rather than provide the energy stored in the air gap of transformer 22 continuously to output port 20, control unit 12 may pulse-width-modulate the output voltage at output port 20 by cycling parallel switch device 26 once the amount of energy stored at transformer 22 reaches a certain level.

Figure 4:
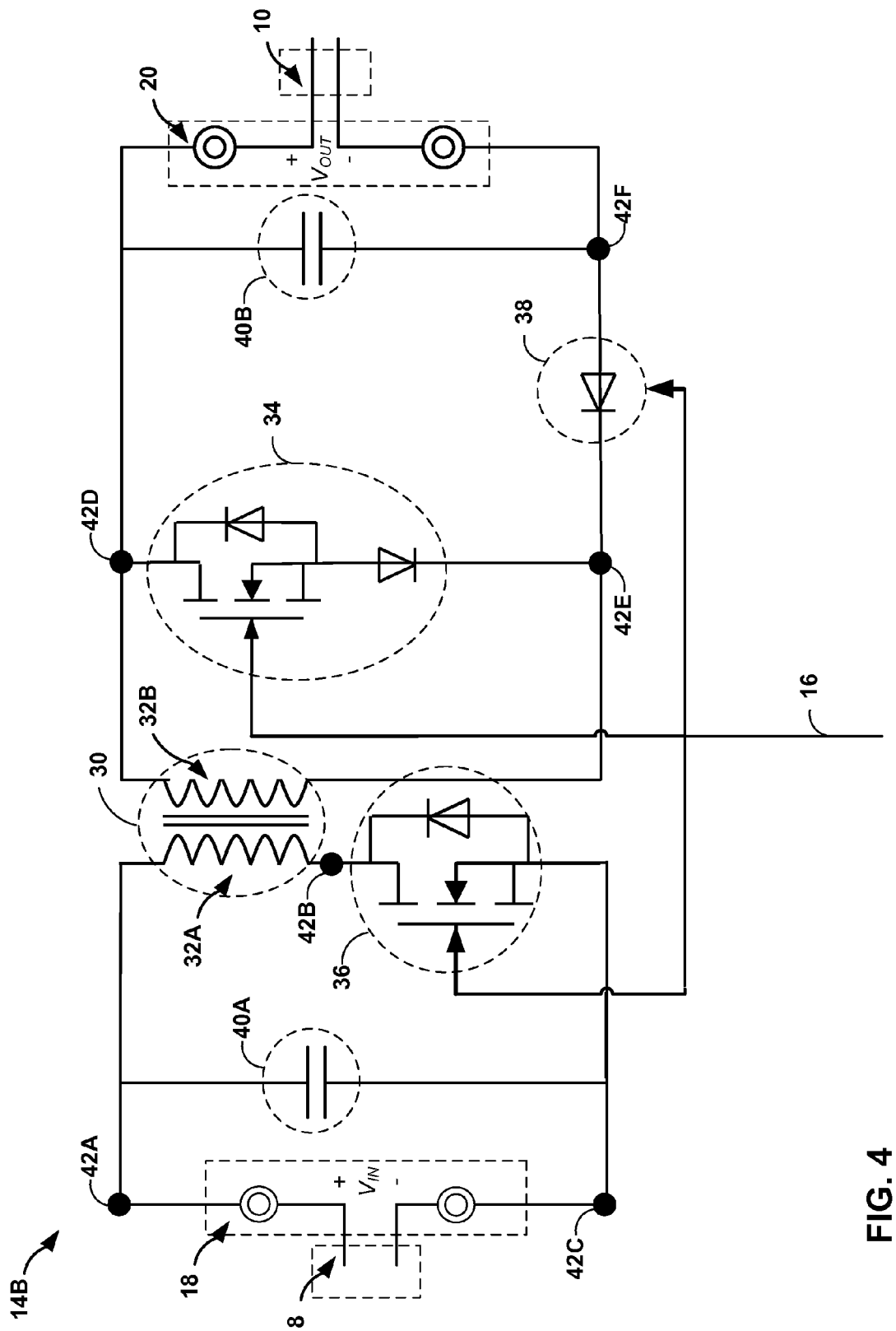
FIG. 4 is a conceptual diagram illustrating another example converter unit for providing a regulated output voltage or a regulated output current, in accordance with one or more aspects of the present disclosure.

FIG. 4 is a conceptual diagram illustrating converter unit 14B for providing a regulated output voltage or a regulated output current, in accordance with one or more aspects of the present disclosure. For instance, FIG. 4 shows a more detailed exemplary view of converter unit 14 of power converter 6 from FIG. 2. Converter unit 14B of FIG. 3 includes one or more electrical components that are arranged and interconnected at connections 42A-42F (collectively "connections 42"). Each of connections 42 represents an electrical coupling between two or more terminals of components of converter unit 14B.

Converter unit 14B includes input port 18 coupled to a voltage source at link 8 and output port 20 coupled to a load at link 10. Converter unit 14B may receive an input voltage via link 8 (e.g., generated by power source 2 of system 1) at input port 18 at connections 42A and 42C. Converter unit 14B can generate an output voltage (e.g., at a load such as device 4 of system 1) across link 10 at connections 42D and 42F coupled to output port 20. In some examples, input port 18 may be arranged in parallel to input capacitor 40A and output capacitor 40B may be arranged in parallel to output port 20.

In addition to input port 18 and output port 20, converter unit 14B includes parallel switch device 34, primary switch 36, secondary element 38, and transformer 30. Transformer 30 may be arranged within converter unit 14B to store energy within an air gap of the core of transformer 30. A first terminal of primary side winding 32A may be coupled to input port 18 at connection 42A. Likewise, a first terminal of secondary side winding 32B may be coupled to output port 20 at connection 42D.

FIG. 4 shows parallel switch device 34 arranged in parallel to secondary side winding 32B of transformer 30. A first terminal of parallel switch device 34 is coupled to a first terminal of secondary winding 32B at connection 42D and a second terminal of parallel switch device 34 is coupled to a second terminal of secondary winding 32B at connection 42E. Many examples of parallel switch device 34 exist. For instance, parallel switch device 34 may in some examples include one or more Silicon (Si), Gallium Nitride (GaN), and/or Silicon Carbide (SiC) based switching devices. Parallel switch device 34 may include one or more bidirectional blocking switches arranged in series and/or further arranged in series with one or more diodes. In some examples, parallel switch device 34 may be a bidirectional blocking and normally-off GaN based switch device with a breakdown voltage of approximately one hundred fifty volts. In some examples, parallel switch device 34 may be GaN high-electron-mobility transistor (HEMT) or any other switch device that can operate as a bidirectional blocking switch.

In the example of FIG. 4, parallel switch device 34 includes an anti-serial switch and a diode. The anti-serial switch of parallel switch device 34 is coupled to connection 42D and may be configured to block the highest level of output voltage that may occur at output port 20. The diode of parallel switch device 34 is coupled to connection 42E and may be configured to block the input voltage reflected at secondary side winding 32B (e.g., a ratio between the input voltage and the winding ratio of transformer 30).

FIG. 4 further shows primary switch 36 arranged in series between input port 18 and primary side winding 32A of transformer 30 and secondary element 38 arranged in series between output port 20 and secondary side winding 32B of transformer 30. A first terminal of primary switch 36 may be coupled to input port 18 at connection 42C and a second terminal of primary switch 36 may be coupled to primary side winding 32A at connection 42B. A first terminal of secondary element 38 may be coupled to output port 20 at connection 42F and a second terminal of secondary element 38 may be coupled to secondary side winding 32B at connection 42E.

Many examples of primary switch 36 and secondary element 38 exist. For instance primary switch 36 and secondary element 38 may in some examples be Silicon (Si), Gallium Nitride (GaN), and/or Silicon Carbide (SiC) based switching devices. In some examples, primary switch 36 and secondary element 38 are each unidirectional, or non-bidirectional, switch devices. In some examples, primary switch 36 may be a normally-off GaN based switch device with a breakdown voltage of approximately seven hundred volts and a resistance of approximately one hundred fifty milliohms. In some examples, secondary element 38 may be a normally-off GaN based switch device with a breakdown voltage of approximately one hundred fifty volts and a resistance of approximately eight to fifteen milliohms. Still in other examples, as shown in FIG. 4, secondary element 38 may be a diode or a silicon based MOSFET being used as a synchronous rectification device. Many other examples of primary switch 36 and secondary element 38 exist and many other combinations of Si, GaN, and SiC based switch devices may be used.

Converter unit 14B may receive one or more commands via link 16 for controlling parallel switch device 34, primary switch 36, and in some instances, secondary element 38 to convert an input voltage at input port 18 into an output voltage at output port 20. For example, converter unit 14B may receive a command from control unit 12 via link 16 that causes any combination of one or more of parallel switch device 34 and primary switch 36 to open and/or close. The commands from control unit 12 may cause converter unit 14B to provide a regulated output voltage, based on the input voltage, at link 10.

Converter unit 14B may receive an input voltage (e.g., from power source 2) at input port 18. In response to detecting the input voltage, control unit 12 may control primary switch 36 cause converter unit 14B to store an amount of energy, based on the input voltage, at transformer 30. For instance, control unit 12 may close primary switch 36 to cause a current path across primary side winding 32A. As control unit 12 continues to hold primary switch 36 closed, current may travel from input port 18 through primary side winding 32A and the amount of energy stored at the air gap of transformer 30 may increase. As the amount of energy stored at transformer 30 builds up, secondary element 38 may act as a synchronous rectification device, secondary element 38 may "block" to prevent current from flowing through output capacitor 40B at output port 20. To prevent a short circuit operation of primary switch 36, control unit 12 may open parallel switch device 34 prior to and/or while closing primary switch 36.

To improve regulation accuracy of the output voltage at output port 20, control unit 12 may control parallel switch device 34 to control the amount of energy transferred from transformer 30 to output port 20. In other words, once an amount of energy has been stored at transformer 30, control unit 12 may control parallel switch device 34 to regulate an output voltage at output port 20 and prevent the stored energy from automatically transferring to output port 20. In some examples, to prevent a short circuit operation of primary switch 36, control unit 12 may open primary switch 36 prior to and/or while closing parallel switch device 34.

For example, by closing parallel switch device 34, control unit 12 may short circuit secondary side winding 32B and cause a free-wheeling current path at secondary winding 32B of transformer 30. The free-wheeling current path preserves the stored energy at transformer 30 and prevents the energy from automatically being transferred to output port 20 all at once. The free-wheeling current path may produce approximately zero volts through parallel switch device 34 across secondary side winding 32B. By opening parallel switch device 34, stored energy at transformer 30 may transfer to output port 20. Control unit 12 can utilize this free-wheeling current path to regulate or limit the amount of energy that converter unit 14B outputs over time improve the regulation accuracy of the output voltage at output port 20. Control unit 12 may cycle parallel switch device 34 to control the amount of the energy that output capacitor 22B receives over time. In other words, control unit 12 may cycle parallel switch device 34 to pulse-width-modulate an output voltage at output port 20.

By driving parallel switch device 34 in a pulse-width modulated manner, the energy transfer per time unit from the air gap of transformer 30 to output capacitor 40B and output port 20 can be finely controlled by control unit 12, resulting in a high regulation accuracy of the output voltage at output port 20. Control unit 12 may vary the duty cycle that control unit 12 pulse-width modulates parallel switch device 34 to increase and/or decrease the amount of stored energy that output port 20 receives at one time. In some examples, by commanding parallel switch device 34 to remain closed for a certain amount of time, control unit 20 can cause the output voltage at output port 20 to decrease down to a zero voltage level.

In some examples, converter unit 14B of FIG. 4 may be used in conjunction with control unit 12 to create a single port and multiple output example of power converter 6. In other words, using converter unit 14B, power converter 6 may have a single output port, such as output port 20, from which power converter 6 can provide a variable level of output voltage by controlling the duty cycle at which parallel switch device 34 is opened and closed.

In some examples, control unit 12 may determine a required voltage associated with a device coupled to output port 20 and control primary switch 36 and parallel switch device 34 based on the required voltage to generate the required voltage as the output voltage at output port 20. In some examples, control unit 12 may determine an amount of load at output port 20 and control parallel switch device 34 and primary switch 26 to automatically adjust the level of output voltage output port 20. For instance, a power converter (e.g., a USB connector that can vary the output voltage at output port 20 to step-less in-between five volts and twenty volts) may rely on control unit 12 and converter unit 14B to provide either five volts, twelve volts, or twenty volts or any voltage level in-between five volts and twenty volts at output port 20 depending on the amount of load connected to output port 20 and/or the voltage required by the device connected to the power converter.

In some examples, control unit 12 may determine an amount of load at output port 20 and/or a required voltage associated with a device coupled to output port 20 using frequency shift keying techniques. For instance, control unit 12 may receive information from a device (e.g., device 4) via link 10 which is coupled to output port 20 and based on the information, determine a required voltage associated with the device and/or an amount of load associated with the device.

In some examples, control unit 12 may determine (e.g., based on frequency shift keying techniques) that a maximum voltage (e.g. twenty volts) is required by a device coupled to output port 20. Control unit 12 may hold open parallel switch device 34 in response to determining that the required voltage corresponds to a maximum voltage associated with converter unit 14B. Control unit 12 may hold parallel switch device 34 open regardless of the amount of load at output port 20. In this way, control unit 12 may regulate the output voltage (e.g., twenty volts) at output port 20 by controlling the duty cycle of primary switch 36. Control unit 12 may cause converter unit 14B to operate in DCM, CCM, or any mix of DCM and CCM or in a zero-voltage switched (ZVS) operation mode.

In some examples, control unit 12 may determine (e.g., based on frequency shift keying techniques) that a mid-level voltage (e.g. twelve volts) is required by a device coupled to output port 20. In other words, control unit 12 may determine that the output voltage required at output port 20 is neither a maximum voltage level (e.g., twenty volts), a minimum voltage level (e.g., five volts), nor a zero voltage level. In cases where control unit 12 determines that the required voltage corresponds to a mid-level voltage, control unit 12 may cause parallel switch device 34 to remain open, closed, or cycle depending on the amount of load at output port 20.

For instance, if the amount load at output port 20 satisfies a load value threshold, control unit 12 may cause parallel switch device 34 to remain open (e.g., control unit 12 may hold parallel switch device 34 open) and allow energy stored at transformer 30 to automatically pass to output port 20. Control unit 12 may determine that the amount of load at output port 20 satisfies the threshold if control unit 12 determines that the amount of load is greater than or equal to fifty percent of the maximum amount of load supported by converter unit 14B. In this case, control unit 12 may regulate the output voltage (e.g., twelve volts) at output port 20 by controlling the duty cycle of primary switch 36. In other words, control unit 12 may hold parallel switch device 34 open in response to determining that the amount of load satisfies the threshold and allow stored energy at transformer 30 to automatically transfer to output port 20 when the amount of load at output port 20 exceeds some threshold value (e.g., to generate a mid-level voltage at output port 20).

If the amount of load at output port 20 does not satisfy the load value threshold (e.g., if control unit 12 determines that the amount of load is less than or equal to a fifty percent maximum load value), control unit 12 may cycle parallel switch device 34 with a duty cycle sufficient to regulate the output voltage (e.g., twelve volts) at output port 20. In other words, control unit 12 may cycle parallel switch device 34 to regulate the output voltage in response to determining that an amount of load at output port 20 does not satisfy a threshold. Control unit 12 may cycle parallel switch device 34 to pulse-width-modulate a mid-level voltage at output port 20 if the amount of load is less than or equal to a fifty percent maximum amount of load. Control unit 12 may cause converter unit 14B to operate in DCM, CCM, or any mix of DCM and CCM or in a zero-voltage switched (ZVS) operation mode.

In some examples, control unit 12 may determine (e.g., based on frequency shift keying techniques) that a minimum voltage (e.g. five volts) is required at output port 20. In this example, control unit 12 may control the duty cycle of parallel switch device 34 to pulse-width modulate and regulate the minimum output voltage at output port 20, regardless of the value of the load at output port 20. In this case, the output voltage may be de-rated at the minimum voltage (e.g. five volts) and control unit 12 may cause converter unit 14B to operate in CCM mode to allow a nearly constant current at output port 20.

In some examples, control unit 12 may determine (e.g., based on frequency shift keying techniques) that a zero voltage level is required by a device coupled to output port 20. In this example, control unit 12 may cause parallel switch device 34 to remain closed (e.g., control unit 12 may hold closed parallel switch device 34) to provide a zero voltage level at output port 20. In addition, control unit 12 may cause primary switch 36 to open to prevent further energy from being delivered to and stored by transformer 30.

In some examples, such as those described above, control unit 12 may select a duty cycle for controlling (e.g., pulse-width modulating) parallel switch device 34 and/or primary switch 36 based at least in part on the amount of load at output port 20 and/or a voltage required by a device coupled to output port 20. For instance, control unit 12 may determine an amount of load coupled to output port 20. Control unit 12 may select a first duty cycle for controlling primary switch 36 based at least in part on the amount of the load and/or the input voltage at input port 18. In addition, control unit 12 may select a second duty cycle for controlling parallel switch device 34 based at least in part on the amount of load and/or the input voltage at input port 18. In some examples, control unit 12 may select the first duty cycle for controlling primary switch 36 and the second duty cycle for controlling parallel switch device 34 using an efficiency algorithm.

There may be multiple pairs of second duty cycle and first duty cycle combinations that control unit 12 may use to generate a particular output voltage for a particular amount of load at output port 20. However certain first and second duty cycle pairs may be more efficient than others. Control unit 12 may include one or more lookup tables or run-time efficiency adjustment algorithms that control unit 12 may use to select the most efficient first and second duty cycle pair, based on the particular output voltage level and amount of load at output port 20.

For instance, in one example efficiency algorithm, control unit 12 may determine, for each pair, the temperature of primary switch 36 and parallel switch device 34. Based on the temperature, control unit 12 may determine a figure-of-merit (e.g., a quantity used to characterize the performance of converter unit 14B for this pair) based on the temperatures). Control unit 12 may vary the first and second duty cycles in such a way as to adjust this figure-of-merit to determine the most efficient duty cycle pair for a particular output voltage and amount of load. In another example, control unit 12 may determine the current through primary switch 36 and look-up the current value within a look-up table to determine the appropriate duty cycle pair. In yet another example, without determining temperature and/or current, control unit 12 may perform a look-up within a table for the most efficient first and second duty cycle pair based on the required output voltage and/or load condition at output port 20.

By allowing for adjustments or changes based on selection of the first and second duty cycles, converter unit 14B may be easier to configure for efficiency than other converters that rely on other types of flyback converter configurations. The first duty cycle may be selected to provide sufficient stored energy within transformer 30 and the second duty cycle may be selected to increase regulation accuracy. These first and second duty cycles can be selected during design, manufacturing, installation, and/or operational use of converter unit 14B. In other types of flyback converter-based converters, adjustments or changes may require both regulation of the primary side switching frequency and also an appropriate up-front selection of the windings within the transformer during design or manufacturing (e.g., not during installation nor during operational use).

Figure 5:
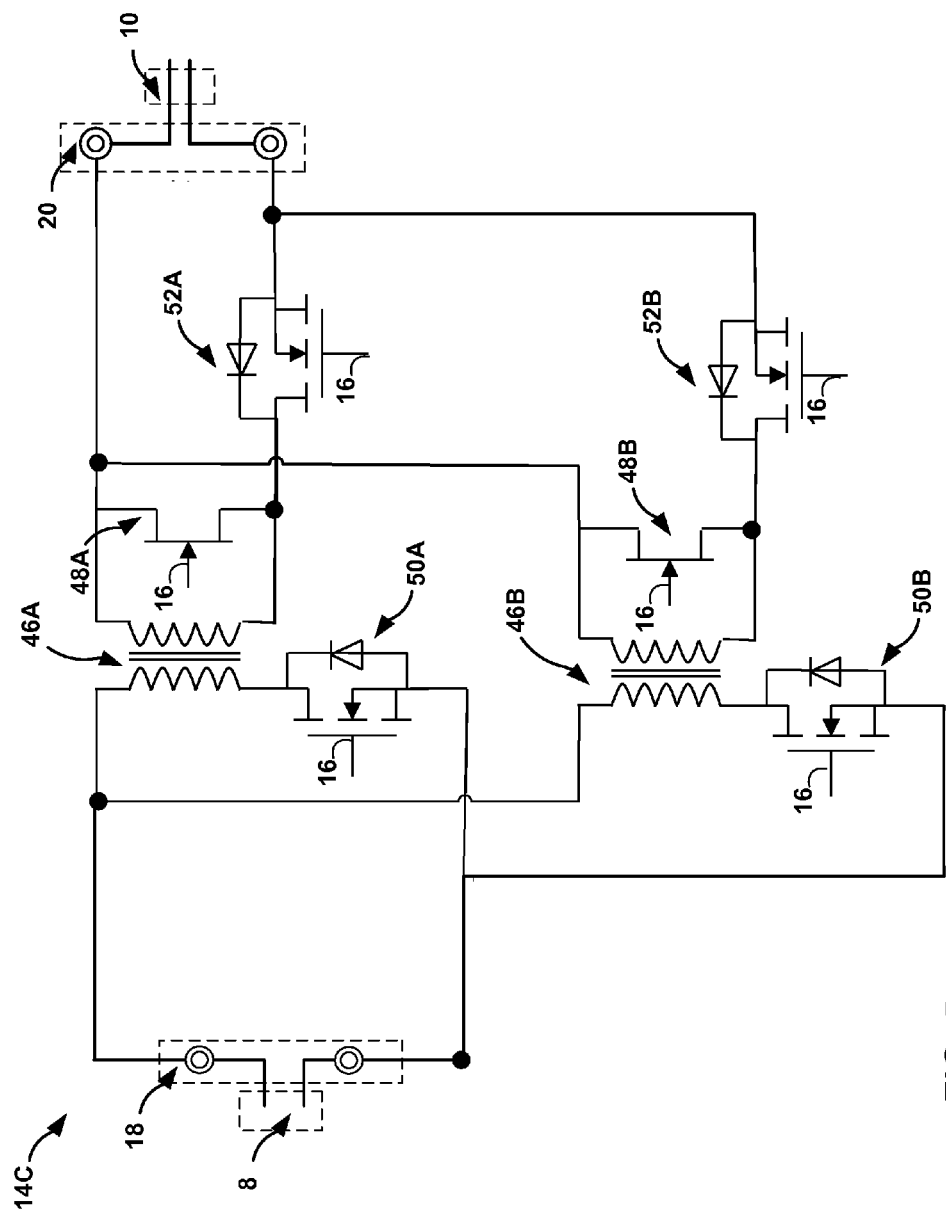
FIG. 5 is a conceptual diagram illustrating an example converter unit for providing multiple output voltages or output currents at a single output port, in accordance with one or more aspects of the present disclosure.

FIG. 5 is a conceptual diagram illustrating converter unit 14C for providing multiple output voltages or output currents at output port 20, in accordance with one or more aspects of the present disclosure. For instance, FIG. 5 shows a more detailed exemplary view of converter unit 14 of power converter 6 from FIG. 2. Converter unit 14C of FIG. 5 includes some of the components of converter 14B of FIG. 4. However, unlike converter unit 14B of FIG. 4, converter unit 14C of FIG. 5 includes two transformers and two parallel switch devices for providing multiple output voltages at output port 20. Converter unit 14C of FIG. 5 is described below within the context of system 1 of FIG. 1 and power converter 6 of FIG. 2.

Converter unit 14C of FIG. 5 may be referred to as an "Interleaved Flyback power circuit with a single output port and multiple output levels" and may offer even greater regulation accuracy of an output voltage at output port 20. Converter unit 14C includes input port 18 and output port 20 separated by multiple combinations of parallel switch devices arranged in parallel to multiple transformers. Control unit 12 may cause parallel switch devices 48A and 48B and/or primary switches 50A and 50B of converter unit 14C to operate out of phase by one hundred eighty degrees from one another. For instance, control unit 12 may cause one transformer to build up energy from input port 18 while causing another transformer to dump stored energy at output port 20.

In this way, converter unit 14C can operate as a near constant voltage or current source and provide an output voltage at output port 20 with no, or almost no, observable voltage and/or current drop when converter unit 14C switches one transformer from a charging mode to a dumping mode. In addition to providing a near constant voltage and/or current source, the surplus energy that may exist at one transformer can be used to improve regulation accuracy of the output voltage at output port.

Converter unit 14C includes parallel switch device 48A arranged in parallel to the secondary side winding of transformer 46A, primary switch 50A arranged in series between the primary side winding of transformer 46A and input port 18, and secondary element 52A arranged in series between the secondary side winding of transformer 46A and output port 20. Converter unit 14C also includes transformer 46B arranged to store energy. Input port 18 may be coupled to a voltage source (e.g., power source 2) and is coupled to the primary side winding of each of transformer 46A and transformer 46B. Output port 20 may be coupled to a load (e.g., device 4) and is coupled to the secondary side winding of each of transformer 46A and transformer 46B. Primary switch 50B is arranged in series between input port 18 and the primary side winding of transformer 46B. Secondary element 52B is arranged in series between the secondary side winding of transformer 46B and output port 20. Control unit 12 may control each of primary switches 50A and 50B, parallel switch devices 48A and 48B, and in some instances, control each of secondary elements 52A and 52B via links 16.

In some examples, secondary elements 52A and 52B may act as synchronous switches, reducing the voltage drop across secondary elements 52A and 52B when operating in the third quadrant, that is, when supporting negative current at negative drain-source voltage. In addition, the gate signals (e.g., signals from control unit 12 over link 16) for controlling secondary elements 52A and 52B may be optional, for instance, in cases where secondary elements 52A and 52B are diodes (e.g., as shown with secondary element 38 of FIG. 4).

Control unit 12 control primary switch 50A to store a first amount of energy at transformer 46A based on the input voltage at input port 18 and further control parallel switch device 48A to regulate the output voltage at output port 20 based on the first amount of stored energy. Additionally, control unit 12 may control primary switch 50B to store a second amount of energy at transformer 46B, and may control parallel switch device 48B to regulate the output voltage at output port 20 based on the second amount of stored energy at transformer 46B. In this way, the output voltage at output port 20 of converter unit 14C may be based on both the first amount of energy stored at transformer 46A and the second amount of energy stored at transformer 46B.

For instance, in some examples, control unit 12 may control primary switch 50B and parallel switch device 48B with primary and secondary duty cycles that are one hundred eighty degrees out-of-phase with the primary and secondary duty cycles used to control primary switch 50A and parallel switch device 48A. In some examples, control unit 12 may control primary switch 50B and parallel switch device 48B with primary and secondary duty cycles that are in-phase or at least partially overlapping in-phase with the primary and secondary duty cycles used to control primary switch 50A and parallel switch device 48A so that the output voltage at output port 20 is simultaneously based on stored energy from both transformers 46A and 46B. In some examples, for example when each of the first and second duty cycles are greater than fifty percent, the conduction times of secondary elements 52A and 52B may overlap, for instance, to provide a constant output current at output port 20.

For example, to regulate a constant output current at output port 20, control unit 12 may control both parallel switch devices 52A and 52B with approximately fifty percent duty cycles to cause stored energy from at least one of transformer 46A and 46B to continuously be provided as current at output port 20. In other words, operating parallel switch device 52A and 52B with approximately fifty percent duty cycles may ensure that approximately half of the amount of current being driven at output port 20 comes from each of transformers 46A and 46B and during charging (e.g., when primary switches 50A and 50B are closed) energy being provided by the transformer 46A and 46B that is not being charged can be used to supplement the energy lost from the transformer 46A and 46B that is being charged. Said differently, as the amount of energy stored at transformer 46A becomes depleted, parallel switch device 48B can be controlled to cause an increased amount of energy stored at transformer 46B to be used to provide current at output port 20 so that the amount of current at output port 20 remains constant. Likewise, as the amount of energy stored at transformer 46B becomes depleted, parallel switch device 48A can be controlled to cause an increased amount of energy stored at transformer 46A to be used to provide current at output port 20.

When control unit 12 causes either transformers 46A or 46B to store energy and to not deliver power (e.g., when the respective primary switch 50A or 50B is closed), control unit 12 may cause the other one of transformers 46A and 46B to take over the process of providing energy by way of a constant current at output port 20. Control unit 12 can control parallel switch devices 48A and 48B to ensure equal loading of the output current at output port 20 between the transformers 46A and 46B. In this way, control unit 12 can cause a constant current at output 20 with virtually or almost no ripple and as such, converter unit 14C may provide constant current at output port 20 without the need for an output capacitor at output port 20.

In other words, in some examples, control unit 12 may control primary switch 50A according to a first duty cycle and may control primary switch 50B according to a second duty cycle. The first duty cycle and the second duty cycle may be at least fifty percent duty cycles. Control unit 12 may control both primary switch 50A and primary switch 50B according to the first and second duty cycles to provide a constant output current at the output port. Output port 20 may exclude an output capacitor.

In some examples, control unit 12 may control parallel switch device 48A according to a first duty cycle and control unit 12 may control parallel switch device 48B according to a second duty cycle. The first duty cycle and the second duty cycle may both be at least fifty percent duty cycles. Control unit 12 may control both parallel switch device 48A and parallel switch device 48B according to the first and second duty cycles to provide a constant output current at output port 20. Output port 20 may exclude an output capacitor.

Figure 6:
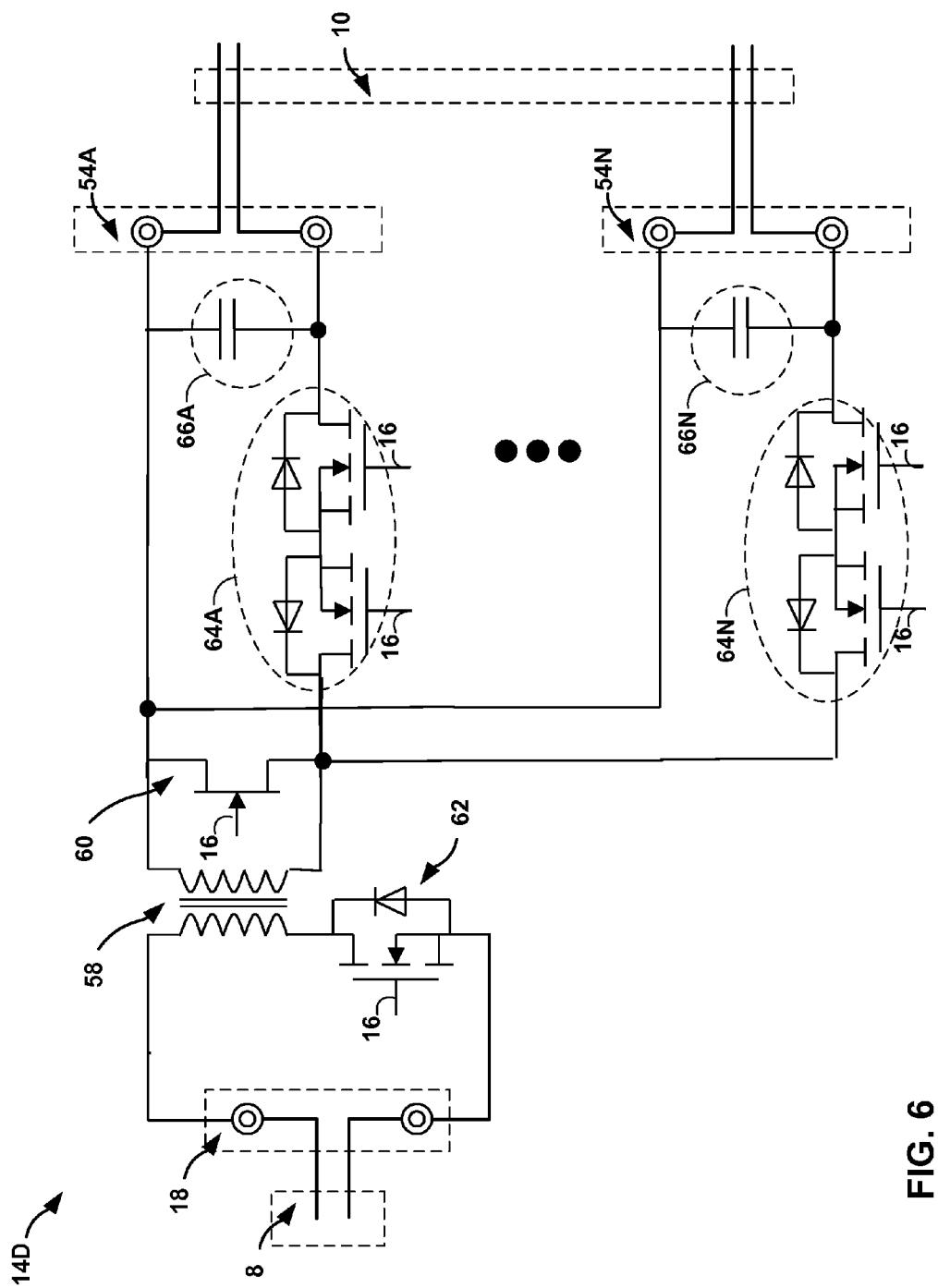
FIG. 6 is a conceptual diagram illustrating an example converter unit for providing multiple output voltages or output currents at multiple output ports, in accordance with one or more aspects of the present disclosure.

FIG. 6 is a conceptual diagram illustrating converter unit 14D for providing multiple output voltages or output currents at multiple output ports, in accordance with one or more aspects of the present disclosure. For instance, FIG. 6 shows a more detailed exemplary view of converter unit 14 of power converter 6 from FIG. 2. Converter unit 14D is described within the context of power converter 6 of system 1 of FIG. 1 may operate in conjunction with control unit 12 of FIG. 3 to create a combination multiple output port and multiple output voltage power converter.

Converter unit 14D includes input port 18 which may be coupled to power source 2 at link 8. Converter unit 14D further includes primary switch 62 arranged in series between a primary side winding of transformer 58 and input port 18 and configured to build up energy at transformer 58 based on the input voltage at input port 18. Converter unit 14D further includes parallel switch device 60 arranged in parallel to the secondary side winding of transformer 58 and configured to regulate the amount of energy dumped overtime from transformer 58.

Converter unit 14D further includes a plurality of output ports, including output ports 54A and 54N, coupled to device 4 at link 10. Output port 54A is coupled to capacitor 66A and output port 54N is coupled to output capacitor 66N. In some examples, output capacitors 66A and 66N are omitted from converter unit 14D. In other words, each of the plurality of output ports may be coupled to a corresponding output capacitor or no corresponding output capacitor. Converter unit 14D further includes a plurality of secondary elements; each of the plurality of secondary elements is arranged in series between the secondary winding of transformer 58 and a corresponding one of the plurality of output ports.

For example, secondary element 64A is arranged in series between the secondary winding of transformer 58 and output port 54A and secondary element 64N is arranged in series between the secondary winding of transformer 58 and output port 54N. The plurality of output ports, including output port 54A and 54N may be coupled, by way of series connections with secondary elements 64A and 64N, to the secondary side winding of transformer 58. Said differently, a first terminal of each of the plurality of output ports 54A and 54N may be coupled to a first terminal of the secondary side winding of transformer 58 and a second terminal of each of the plurality of output ports 54A and 54N may be coupled, by way of a connection to secondary elements 64A and 64N, to a second terminal of the secondary side winding of transformer 58. In some examples, when converter unit 14D provides a greater level of output voltage at output port 54A than the level of output voltage at output port 54N, secondary element 64A may be a unidirectional blocking switch rather than the more complicated configuration of two anti-serially connected switches as shown in FIG. 6. In some examples, secondary elements 64A and 64N may each be a rectifying diode similar to the rectifying diode shown in FIG. 4 as secondary element 38.

Control unit 12 may control parallel switch device 60 and the plurality of secondary elements (e.g., secondary element 64A and 64B) to regulate a respective output voltage at each of the plurality of output ports (e.g., output port 54A and 54B). That is, the respective output voltage at each of the plurality of output ports (e.g., output port 54A and 54B) may be based on the stored amount of energy at transformer 58.

For example, control unit 12 may turn-on primary switch 62 while control unit 12 turns-off parallel switch device 60 and secondary elements 64A and 64B. Next, once an amount of energy has been build up at transformer 58, control unit 12 may turn-off primary switch 62 and turn-on secondary element 64A without turning on either parallel switch device 60, or secondary element 64B. Subsequently, control unit 12 may turn-off secondary element 64A and turn-on parallel switch device 60 without turning on either primary switch 62 or secondary element 64B. Next, control unit 12 may turn-off parallel switch device 60 and turn-on secondary element 64B without turning on either primary switch 62 or secondary element 64A. Next, control unit 12 may turn-off parallel switch device 60 and both secondary elements 64A and 64B and turn-on primary switch 62 to charge transformer 58 back up again. By controlling converter unit 14D in this way, control unit 12 may cause a smooth transition of current (e.g., current commutation) between the plurality of output ports (e.g., output port 54A and 54B).

In some examples, control unit 12 may vary the duty cycles used in controlling the plurality of secondary elements (e.g., secondary element 64A and 64B) to adjust the respective output voltages at each of the plurality of output ports (e.g., output port 54A and 54B). For instance, control unit 12 may cause secondary element 64A to turn-on for a greater amount of time than secondary element 64B to cause the output voltage at output port 54A to be a higher level voltage than the output voltage at output port 54B.

Figure 7:
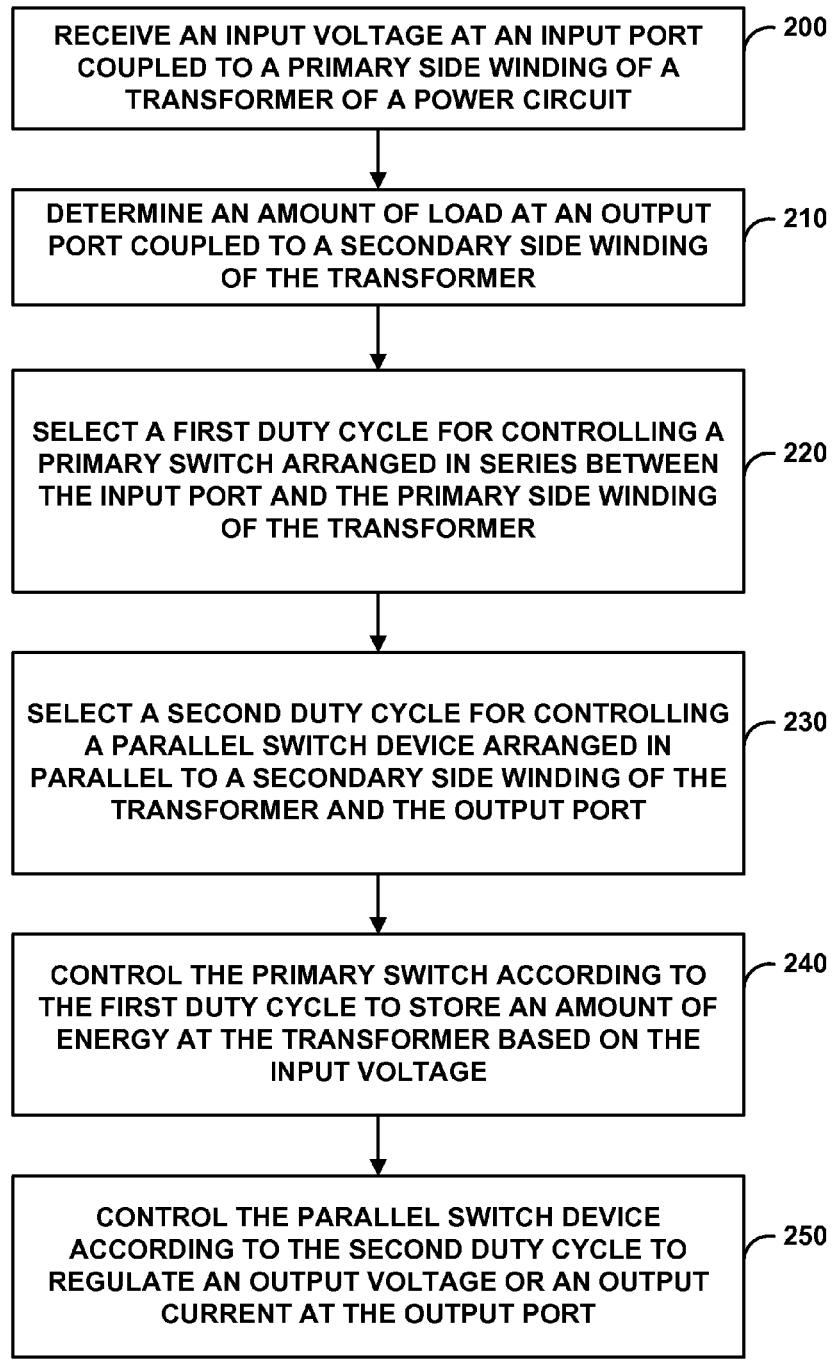
FIG. 7 is a flowchart illustrating example operations of the example power converter, in accordance with one or more aspects of the present disclosure.

FIG. 7 is a flowchart illustrating example operations of power converter 6, in accordance with one or more aspects of the present disclosure. FIG. 6 is described below within the context of system 1 of FIG. 1, control unit 12 and power converter 6 of FIG. 2, and converter unit 14B of FIG. 4.

In the example of FIG. 7, power converter 6 may receive an input voltage at an input port coupled to a primary side winding of a transformer of a power circuit (200). For example, converter unit 14B of power converter 6 may receive an input voltage applied to link 8 at input port 18 by power source 2.

Power converter 6 may determine an amount of load at an output port coupled to a secondary side of the transformer (210). For example, converter unit 14B of power converter 6 may receive information from device 4 over link 10 using frequency shift keying techniques that indicate an amount of load associated with device 4 and/or the output voltage that device 4 requires as device 4 is coupled to output port 20.

In the example of FIG. 7, power converter 6 may select a first duty cycle for controlling a primary switch arranged in series between the input port and the primary side winding of the transformer (220). Additionally, power converter 6 may select a second duty cycle for controlling a parallel switch device arranged in parallel to a secondary side winding of the transformer and the output port (230). For example, control unit 12 may utilize one or more efficiency algorithms and/or one or more look-up tables to determine the duty cycle for controlling primary switch 36 of converter unit 14B, and the duty cycle for controlling parallel switch device 34 of converter unit 14B to generate the output voltage or output current at output port 20 for the particular input voltage at input port 18 and determined amount of load at output port 20. The duty cycle for parallel switch device 34 may be zero for some time intervals and the duty cycle for primary switch 36 may be zero for some time intervals (e.g., when power converter 6 operates in "burst mode").

In the example of FIG. 7, converter unit 14B may control the primary switch according to the first duty cycle to store an amount of energy at the transformer based on the input voltage (240). For example, control unit 12 may provide commands over link 16 that cause primary switch 36 of converter unit 14B to close (e.g., "turn-on") for some amount of time according to the first duty cycle to build up an amount of energy stored at transformer 30.

In the example of FIG. 7, converter unit 14B may control the parallel switch device according to the second duty cycle to regulate an output voltage or an output current at the output port (250). For example, control unit 12 may provide commands over link 16 that cause parallel switch device 34 to close (e.g., "turn-on") for some amount of time according to the second duty cycle to transfer the stored energy at transformer 30 to output port 20.

FIGS. 8-12 are timing diagrams illustrating timing characteristics of power converter 6 of system 1 of FIG. 1, in accordance with one or more aspects of the present disclosure. FIGS. 8-12 are described below within the context of control unit 12 of FIG. 2 and converter unit 14B of FIG. 4 and converter unit 14C of FIG. 5. In the descriptions of FIGS. 8-12, control unit 12 is configured to detect and measure the current level and/or voltage level at each of the components of converter unit 14B and 14C.

Figure 8:
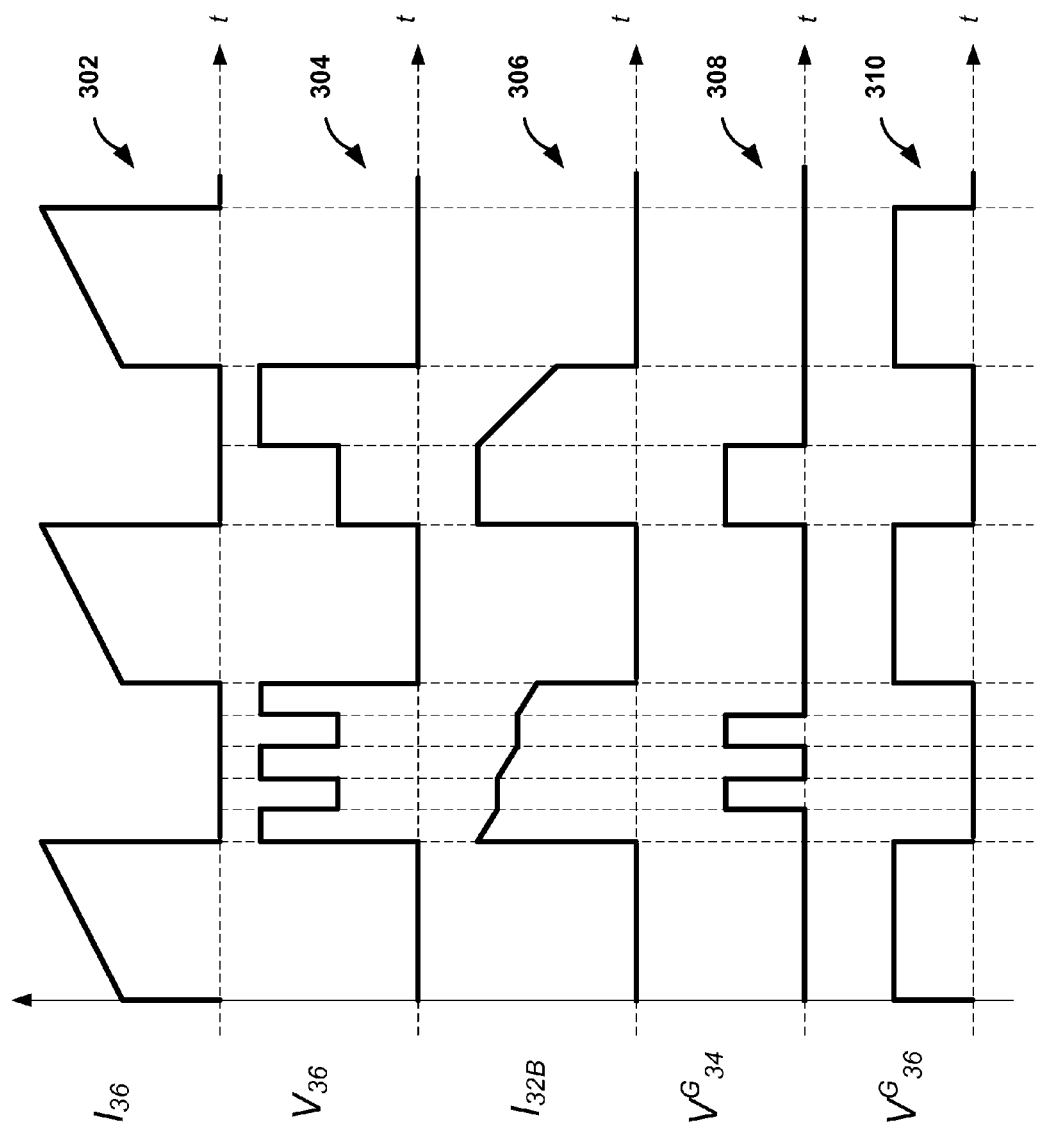
FIGS. 8-12 are timing diagrams illustrating timing characteristics of the example power converter, in accordance with one or more aspects of the present disclosure.

FIG. 8 shows one example of control unit 12 causing converter unit 14B of FIG. 4 to operate in continuous current mode (CCM). Some characteristics of CCM are that the current both on primary side winding 32A of transformer 30 and secondary side winding 32B of transformer 30 oscillates between a minimum positive threshold and an upper current. Neither the "turn-on" nor "turn-off" currents are zero. CCM may be used by control unit 12 to cause a maximum amount of power to travel across converter unit 14B without causing transformer 30 to saturate.

Plots 302-310 show the different voltage and/or current levels across different components of converter unit 14B of FIG. 4 during the same time period that control unit 12 causes converter unit 14B to operate in CCM. Plot 302 represents the current through primary switch 36 over time. Plot 304 shows the voltage across primary switch 36 over time. Plot 304 shows the current through secondary side winding 32B of transformer 30 over time. Plot 306 shows the gate signal of parallel switch device 34 (e.g., the command sent by control unit 12 to parallel switch device 34 via link 16). Plot 308 shows the gate signal for primary switch 36 (e.g., the command sent by control unit 12 to primary switch 36 via link 16). In the example of FIG. 8, a high level at the gate of either parallel switch device 34 or primary switch 36 represents a state where the corresponding element is "turned on" and a low level represents a state where the corresponding switch element is "turned off."

Plots 302-310 show that, with primary switch 36 being turned on by control unit 12, the current through primary side winding 32A may increase linearly, and as such, may increase the magnetic flux and the amount of energy stored in the air gap of transformer 30. Turning off primary switch 36 by control unit 12 may cause an increase in the voltage level across primary switch 36 until secondary element 38 (e.g., a diode) becomes conductive. In other words, secondary element 38 may be conductive when the voltage level across primary switch 36 equals $V_{IN}+(V_{OUT}*n)$, with n being the winding ratio of transformer 30, $V_{IN}$ being the input voltage at input port 18, and $V_{OUT}$ being the output voltage at output port 20. In some examples ($V_{OUT}*n$) may also be referred to as a "Flyback voltage" or $V_{FLYB}$.

Once secondary element 38 starts to conduct, the current at secondary side winding 32B starts to decrease. Once control unit 12 causes parallel switch device 34 to turn on, a freewheeling current through secondary side winding 32B and parallel switch device 34 occurs. The freewheeling current may for instance, effectively short-circuit secondary side winding 32B. The voltage across secondary side winding 32B may be approximately zero volts. As a result, control unit 12 can only detect $V_{IN}$ from primary side winding 32A but control unit 12 can no longer detect $V_{FLYB}$ at primary side winding 32A. In some examples, control unit 12 may rely on the voltage at primary side winding 32A to determine whether parallel switch device 34 is on (e.g., by first turning off primary switch 36). Turning off parallel switch device 34 by control unit 12 may cause a current through output capacitor 40B and secondary element 38. Once secondary element 38 (e.g., the body diode) conducts, the channel of secondary element 38 may be turned on in parallel to the conducting body diode. This technique may require a buffer of time (e.g., dead time), after current flows through the body diode, and a buffer of time prior to control unit 12 turning on parallel switch device 34. In some examples, by selecting a particular duty cycle for parallel switch device 34 control unit 12 can accurately regulate the output voltage $V_{OUT}$ at output port 20. Other techniques for controlling converter unit 14B are described in more detail below with respect to FIG. 9.

Figure 9:
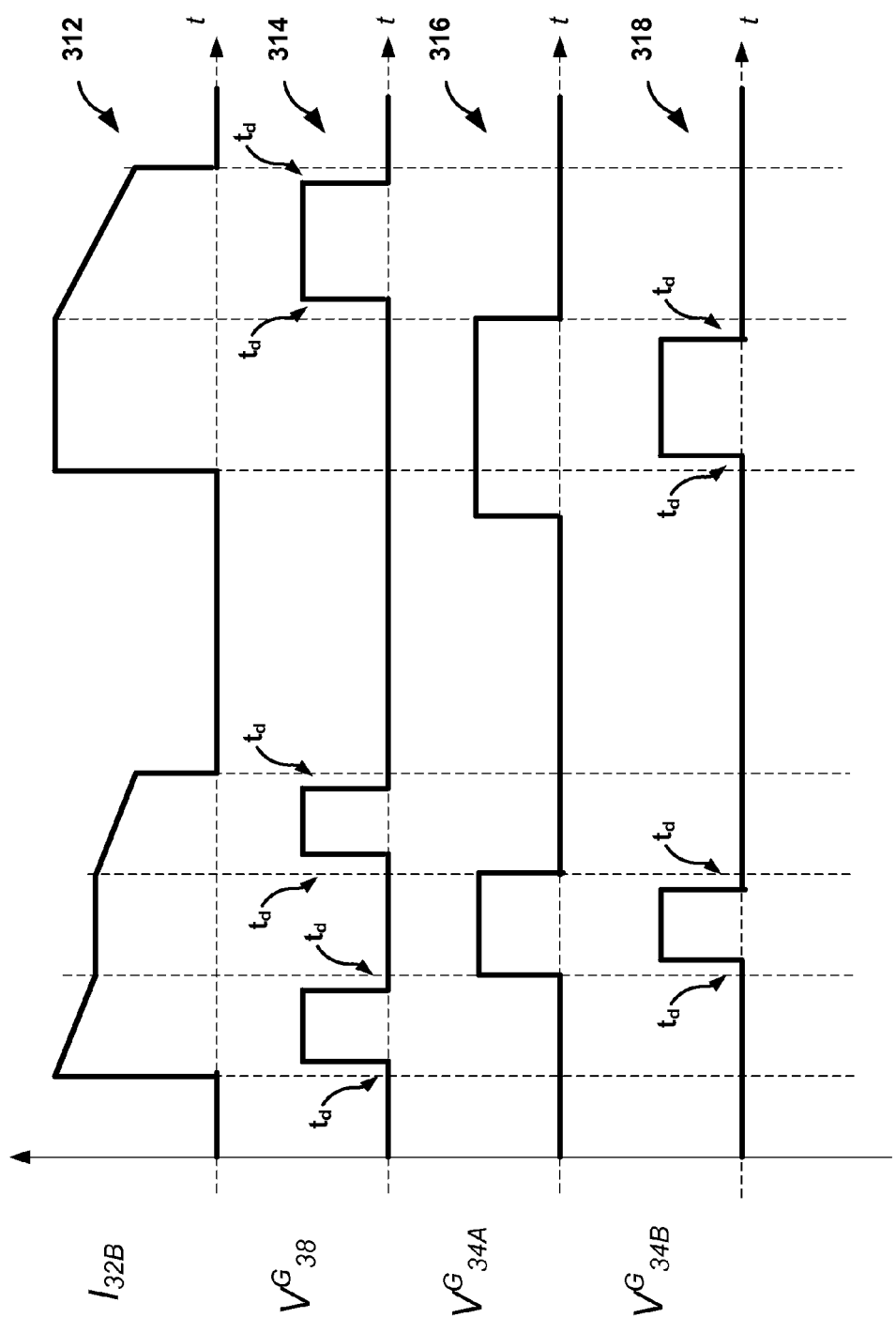

FIG. 9 shows an additional example of control unit 12 causing converter unit 14B of FIG. 4 to operate in continuous current mode (CCM). In the example of FIG. 9, parallel switch device 34 is described as being a bidirectional blocking switch device that includes a first blocking switch (e.g., a one hundred fifty volt MOSFET) arranged in series with a second blocking switch (e.g., a forty volt MOSFET) (e.g., similar to parallel switch device 26 of converter unit 14A of FIG. 3). In addition, secondary element 38 is described as being a normally-off GaN based switch device similar to secondary elements 52A and 52B of FIG. 5.

Plots 312-318 show the different voltage and/or current levels across different components of converter unit 14B of FIG. 4 during the same time period that control unit 12 causes converter unit 14B to operate in CCM. Plot 312 represents the current through secondary side winding 32B over time. Plot 314 shows the gate voltage at secondary element 38 over time (e.g., the command sent by control unit 12 to secondary element 38 vial link 16). Plot 316 shows the gate signal at the first blocking switch (e.g., the active switch) of parallel switch device 34 and plot 318 shows the gate signal at the second switch (e.g., the inactive or synchronous switch) of parallel switch device 34 (e.g., plots 316 and 318 represent the commands sent by control unit 12 to parallel switch device 34 via link 16).

In the example of FIG. 9, control unit 12 may turn on the active switch of parallel switch device 34 (e.g., switch 34A) to create a freewheeling current path for the current from secondary side winding 32B to pass through parallel switch device 34. Control unit 12 may cause the second switch of parallel switch device 34 (e.g., the inactive or synchronous switch) to turn on with a turn-on delay time and/or turn off a little bit earlier than when control unit 12 may cause the first switch of parallel switch device 34 (e.g., the active switch) to turn off. In the example of FIG. 9, control unit 12 may operate parallel switch device 34 with a higher switching frequency than primary switch 36.

FIG. 9 further shows that control unit 12 may cause the first (e.g., active) switch of parallel switch device 34 to turn on while primary switch 36 is also on. After control unit 12 causes primary switch 36 to turn off, the body diode of the second switch (e.g., the inactive or synchronous switch) of parallel switch device 34 may clamp the voltage across parallel switch device 34 to $V_{IN}$. Control unit 12 may cause the first switch (e.g., the active switch) of parallel switch device 34 to switch at a zero volt condition, which may improve switching loss. In the example of FIG. 9, the first switch of parallel switch device 34 may be operating at the same switching frequency as primary switch 36. In other words, control unit 12 may control both primary switch 36 and parallel switch device 34 to reduce the voltage level of the output voltage at output port 20. The output voltage output port 20 may be based on a portion of the amount of energy stored at transformer 30.

Figure 10:
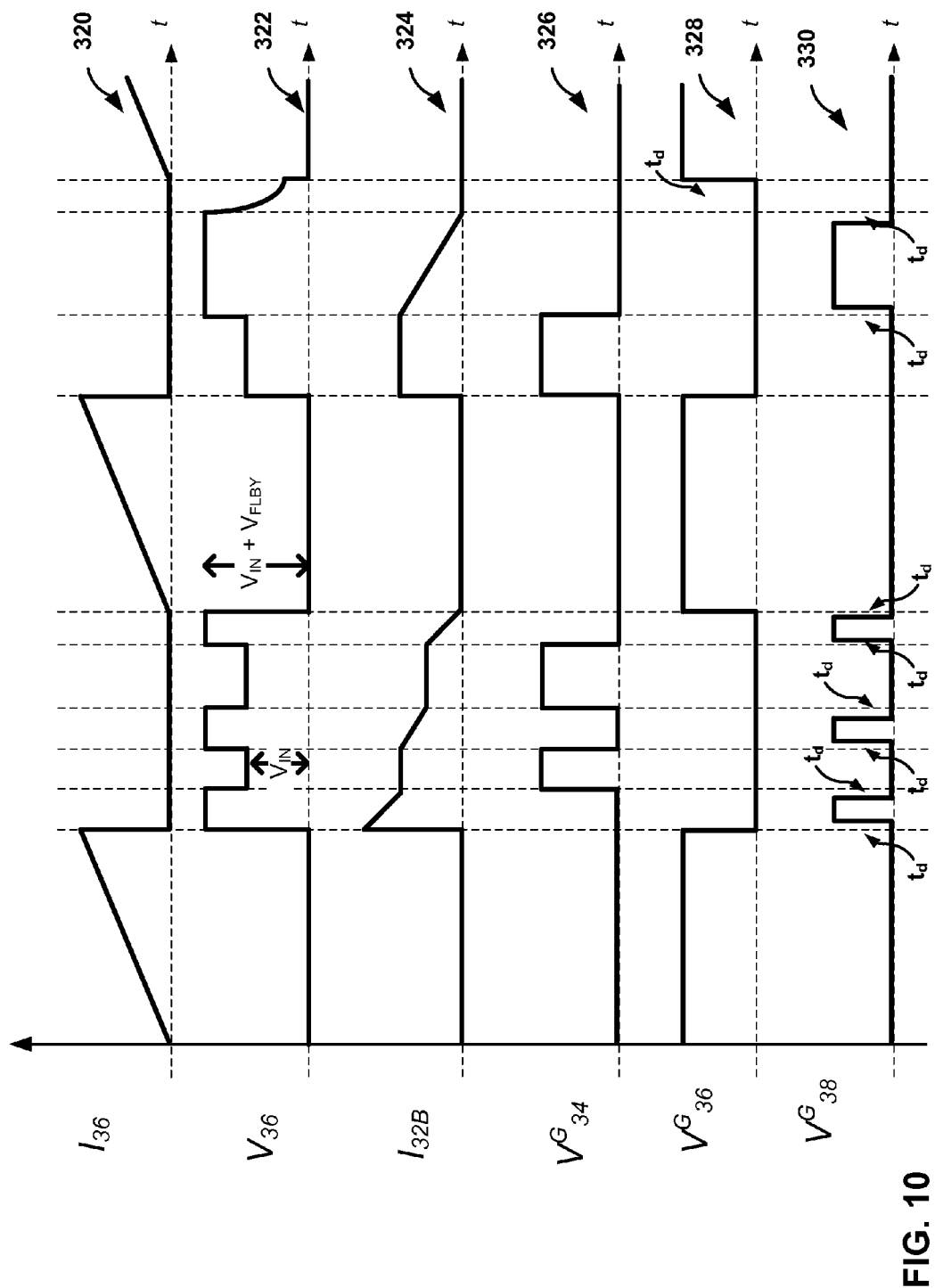

FIG. 10 shows one example of control unit 12 causing converter unit 14B of FIG. 4 to operate in discontinuous current mode (DCM) and Quasiresonant (QR) operation. In the example of FIG. 10, secondary element 38 is described as being a normally-off GaN based switch device similar to secondary elements 52A and 52B of FIG. 5. In some examples where control unit 12 causes converter unit 14B to operate in DCM, control unit 12 may cause secondary element 38 and parallel switch device 34 to cycle until the current at secondary side winding 32B of transformer 30 reaches an approximately zero current. At zero current at secondary side winding 32B, control unit 12 may cause secondary element 38 and parallel switch device 34 to turn off. Control unit 12 may cause primary switch 36 to turns on at the moment when, or just after, the current through secondary side winding 32B reaches zero. If control unit 12 causes primary switch 36 to turns on after the current through secondary side winding 32B reaches zero, the voltage across primary switch 36 may resonate due to a series resonant oscillator created by the output capacitance of primary switch 36 and the leakage inductance of transformer 30. If control unit 12 causes primary switch 36 to turn on at the lowest voltage, control unit 12 may cause converter unit 14B to operate in Quasiresonant operation (QR mode). Control unit 12 may cause primary switch 36 to operate at a variable frequency and secondary element 38 and parallel switch devices to operate at effectively higher frequencies than primary switch 36.

Plots 320-330 show the different voltage and/or current levels across different components of converter unit 14B of FIG. 4 during the same time period that control unit 12 causes converter unit 14B to operate in DCM. Plot 320 represents the current through primary switch 36 over time. Plot 322 shows the voltage across primary switch 36 over time. Plot 324 shows the current through secondary side winding 32B of transformer 30 over time. Plot 326 shows the gate signal of parallel switch device 34 (e.g., the command sent by control unit 12 to parallel switch device 34 via link 16). Plot 328 shows the gate signal for primary switch 36 (e.g., the command sent by control unit 12 to primary switch 36 via link 16). Plot 330 shows the gate signal for secondary element 38 (e.g., the command sent by control unit 12 to secondary element 38 via link 16). In the example of FIG. 10, a high level at the gate of either parallel switch device 34, primary switch 36, or secondary element 38 represents a state where the corresponding element is "turned on" and a low level represents a state where the corresponding switch element is "turned off."

In the example of FIG. 10, plots 320-330 illustrate that one difference between CCM and DCM is that in DCM, control unit 12 may allow the current across secondary winding 32B to reach zero. Once the current across secondary winding 32B to reach zero the body diode of secondary element 38 may revert to being a blocking element since the diode may be unable to allow current to pass in the opposite direction. Control unit 12 may cause the channel of secondary element 38 to turn off prior to, or at the point in time when the current across secondary winding 32B to reach zero. The voltage secondary element 38 may increase. At primary switch 36, the flyback voltage may collapse as the output voltage may no longer be reflected at primary switch 36 (e.g., as the body diode of secondary element 38 is operating in a blocking mode). The voltage at primary switch 36 may decrease to a value approximately equivalent to the difference between the input voltage and the flyback voltage and then increase again. This oscillation in the voltage at primary switch 36 may represent a series resonance, where the converter unit 14B operates by utilizing the leakage inductance of transformer 30 and the output capacitance of primary switch 36. In some examples, if control unit 12 causes primary switch 36 to turn on at a point in time near when operating in a "valley" of the series resonance, control unit 12 may cause converter unit 14B to operate in quasiresonant mode.

When control unit 12 causes converter unit 14B to operate in quasiresonant mode, control unit 12 may control primary switch 36 with a variable frequency (e.g., by turning on primary switch 36 in either the first voltage valley, the second, the third, etc.). Control unit 12 may cause primary switch 36 to turn on in a later occurring valley (e.g., the third valley in time instead of the first valley in time) to reduce the switching frequency of power converter 6 and perhaps, reduce the amount of loss that may occur when a small amount of load is at output port 20. By turning primary switch 36 on at a moment in time when the current at secondary winding 32B reaches zero, control unit 12 may cause converter unit 14B to operate in CCM. By turning on primary switch 36 at any time (e.g. using a fixed frequency for primary switch 36) control unit 12 may cause converter unit 14B to operate in DCM.

Figure 11:
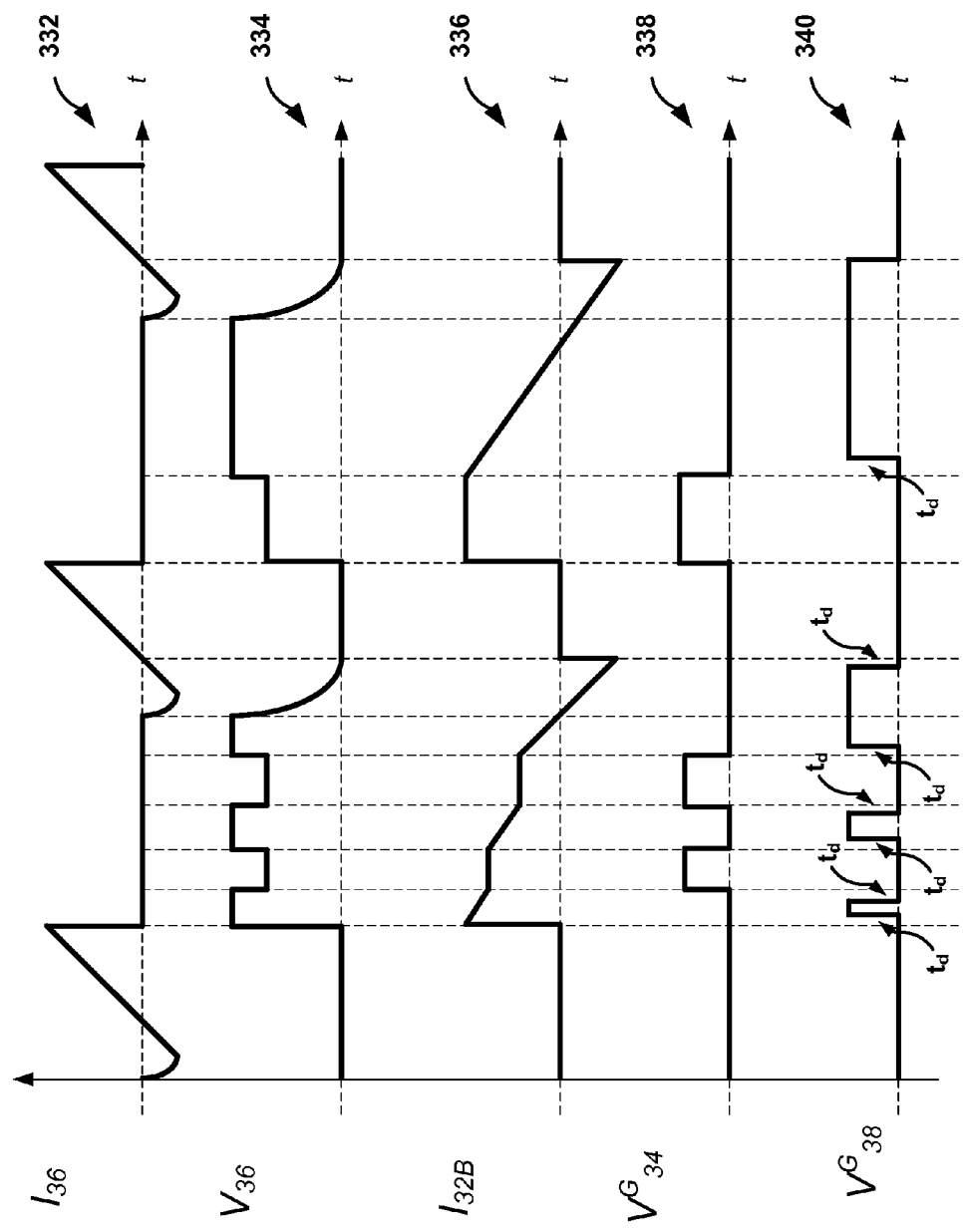

FIG. 11 shows one example of control unit 12 causing converter unit 14B of FIG. 4 to operate in zero voltage switching operation (ZVS) mode. In the example of FIG. 10, secondary element 38 is described as being a normally-off GaN based switch device similar to secondary elements 52A and 52B of FIG. 5.

When causing converter unit 14B to operate in ZVS mode, control unit 12 may cause secondary element 38 to remain turned on even after the current at secondary side 32B of transformer 30 reaches a zero current level. In causing converter unit 14B to operate in ZVS mode, control unit 12 may cause secondary element 38 to conduct in the first quadrant (e.g., positive current at positive drain source voltage) and may transfer energy from secondary side winding 32B back to primary side winding 32A. This current flow from secondary side winding 32B to primary side winding 32A may discharge the output capacitance of primary switch 36 to or near a zero level of voltage, and may cause converter unit 14B to operate with zero voltage switching at primary switch 36. Control unit 12 may cause a variable frequency to be used to control primary switch 36. When operating in ZVS mode, power converter 6 may have a higher degree of efficiency than when operating in another mode.

Plots 332-340 show the different voltage and/or current levels across different components of converter unit 14B of FIG. 4 during the same time period that control unit 12 causes converter unit 14B to operate in ZVS mode. Plot 332 represents the current through primary switch 36 over time. Plot 334 shows the voltage across primary switch 36 over time. Plot 336 shows the current through secondary side winding 32B of transformer 30 over time. Plot 338 shows the gate signal of parallel switch device 34 (e.g., the command sent by control unit 12 to parallel switch device 34 via link 16). Plot 340 shows the gate signal for secondary element 38 (e.g., the command sent by control unit 12 to secondary element 38 via link 16). In the example of FIG. 11, a high level at the gate of either parallel switch device 34, primary switch 36, or secondary element 38 represents a state where the corresponding element is "turned on" and a low level represents a state where the corresponding switch element is "turned off."

In the example of FIG. 10, plots 332-340 illustrate that one difference between ZVS mode and other operating modes of power converter 6 (e.g., DCM, CCM, etc.) is that control unit 12 may cause secondary element 38 to remain turned on after a zero current level at secondary side winding 32B occurs. If control unit 12 causes secondary element to remain turned on even after zero current occurs at secondary side winding 32B, the current at secondary side winding 32B may change direction (e.g., change from a positive to a negative current or a negative to a positive current).

When the current at secondary side winding 32 moves in an opposite direction, a current is drawn out of output capacitor 40B and through secondary side winding 32B, and through secondary element 38. In some examples, when the current direction through secondary element 38 is positive, control unit 12 may cause converter unit 14B to operate in the first quadrant, and control unit 12 may be able to actively switch off the current by sending a command over link 16 to turn off the channel of secondary element 38. The current at secondary side winding 32B may be reflected at primary side winding 32A and the current may further discharge at the output capacitance of primary switch 36. Control unit 12 may cause secondary element to remain turned on for an amount of time that is sufficient to achieve ZVS operation on primary side winding 32A.

Control unit 12 may determine that a moment in time to turn off secondary element 38 is at a moment in time when the voltage at primary switch 36 "swings down." In other words, once the voltage at primary switch 36 reaches zero, control unit 12 may cause primary switch 36 to turn on. In some examples, control unit 12 may turn on primary switch 36 only after some amount of buffer (e.g., an amount of dead time). In some examples, the buffer may ensure that control unit 12 causes secondary element 38 to turn off earlier than when control unit 12 cause primary switch 36 to turn on. Control unit 12 may cause primary switch 36 to operate at variable frequency. In addition, control unit 12 may cause parallel switch device 34 to operate at effectively the same switching frequency as primary switch 36 or at higher switching frequency than primary switch 36. Control unit 12 may control both primary switch 36 and parallel switch device 34 to cause power converter 6 to operate in zero voltage frequency operation mode.

Figure 12:
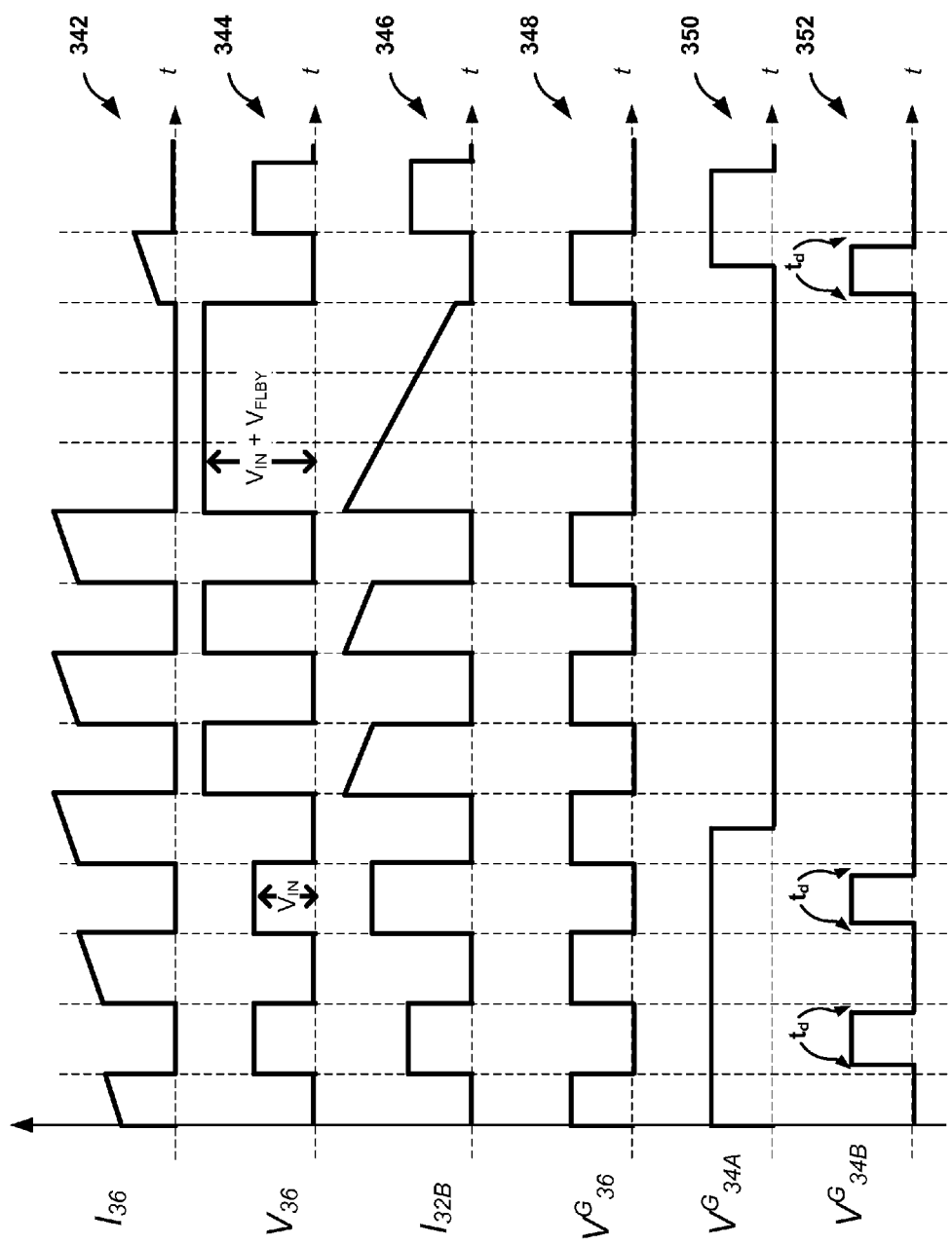

FIG. 12 shows one example of control unit 12 causing converter unit 14B of FIG. 4 to operate by controlling primary switch 36 with a high switching frequency. In the example of FIG. 12, secondary element 38 is described as being a normally-off GaN based switch device similar to secondary elements 52A and 52B of FIG. 5. Additionally, in the example of FIG. 12, parallel switch device 34 is described as being a bidirectional blocking switch device that includes a first blocking switch (e.g., a one hundred fifty volt MOSFET) arranged in series with a second blocking switch (e.g., a forty volt MOSFET) (e.g., similar to parallel switch device 26 of converter unit 14A of FIG. 3).

In the example of FIG. 12, control unit 12 may control parallel switch device 34 not with a duty cycle that fits within one of switching cycles of primary switch 36, but instead control parallel switch device 34 to allow parallel switch device 34 to "blank out" or let the control of parallel switch device 34 to skip entire pulses or pulse packets from primary side winding 32A. In other words, control unit 12 may cause parallel switch device 34 to operate in a lower frequency switching mode than the primary switch 36.

Plots 342-352 show the different voltage and/or current levels across different components of converter unit 14B of FIG. 4 during the same time period that control unit 12 controls primary switch 36 with a high switching frequency. Plot 342 represents the current through primary switch 36 over time. Plot 344 shows the voltage across primary switch 36 over time. Plot 346 shows the current through secondary side winding 32B of transformer 30 over time. Plot 348 shows the gate signal of primary switch 36 (e.g., the command sent by control unit 12 to primary switch 36 via link 16). Plots 350 and 352 show the gate signal of parallel switch device 34 (e.g., the command sent by control unit 12 to the active switch of parallel switch device 34 via link 16 and the inactive or synchronous switch of parallel switch device 34 via link 16 respectively). In the example of FIG. 12, a high level at the gate of either parallel switch device 34 or primary switch 36 represents a state where the corresponding element is "turned on" and a low level represents a state where the corresponding switch element is "turned off."

Plots 342-352 show one example of the characteristics of converter unit 14B when control unit 12 operates parallel switch device 34 at a lower switching frequency than primary switch 36. In some examples, control unit 12 may control primary switch 26 with a fixed frequency (e.g., defined by a resonant circuit).

Control unit 12 may operate primary switch 36 in two different modes, in one mode, referred to as a "regular operation mode," control unit 12 may cause primary switch to turn on regularly at a fixed duty cycle and/or skipping one or more cycles. In another mode, referred to as a "pulse skipping mode." control unit 12 may cause primary switch 36 to operate in an active burst mode and cause primary switch 36 to skip several hundreds of cycles. For each of these two different modes, control unit 12 can cause parallel switch device 34 to either be turned on or turned off and as such, control unit 12 can cause converter unit 14B to operate in a total of four different operation states: regular operation mode with parallel switch device 34 on, regular operation mode with parallel switch device 34 off, pulse skipping operation mode with parallel switch device 34 on, and pulse skipping operation mode with parallel switch device 34 off. With these four different operation states, converter unit 12 can control primary switch 36 and parallel switch device 34 to cause power converter 6 to utilize the entire pulsed energy provided by the duty cycle of primary switch 26 to either output the energy to output port 20, or preserve and "freewheel" the energy within secondary side winding 32B.

When controlling converter unit 14B in the operation state of regular operation mode with parallel switch device 34 off, control unit 12 may cause the current at primary switch 36 and through secondary side winding 32B may ramp up cycle-by-cycle as shown in the first three pulses of plots 342, 346, and 348. Control unit 12 may cause converter unit 14B to operate in this operation state when the current level through primary switch 36 and secondary side winding 32B is below the current saturation level of transformer 30). In the regular operation mode with parallel switch device 34 off, the active switch of parallel switch device 34 may be on, the voltage is clamped through the inactive or synchronous switch to the input voltage, and no flyback voltage is built up.

When controlling converter unit 14B in the operation state of regular operation mode with parallel switch device 34 on, the active switch of parallel switch device 34 may be off. For example, the next two cycles (e.g., the fourth and fifth cycles from the left side) of plots 342, 344, and 346 illustrate the operation state of regular operation mode with parallel switch device 34 on. In this operation state, the pulsed energy is transferred from transformer 30 to the output terminals through the body diode of secondary element 38 and, compared to the previous operation state, the amount of current through secondary side winding 32B decreases.

In the next two operation states, that is, when controlling converter unit 14B in the operation state of pulse skipping operation mode with parallel switch device 34 either off or on, control unit 12 may cause converter unit 14B to skip pulses from primary side winding 32A and primary switch 36. For example, depending on whether the active switch of parallel switch device 34 is switched on or off, the current through secondary side winding 32B may either freewheel (not shown in FIG. 12) or decrease (e.g., as shown by the next 3 cycles). In the example of FIG. 12, control unit 12 may cause the inactive or synchronous switch of parallel switch device 34 to operate as a synchronous FET. Furthermore, in the example of FIG. 12, control unit 12 may cause the active switch of parallel switch device 34 to operate at a significantly lower switching frequency than primary switch 36. By controlling converter unit 14B in this way, the transformer structure of power converter 6 can be made very small, and in some examples, optimized for high switching frequency, without having to regulate the output voltage through duty cycle variations in the control of primary switch 36. Control unit 12 can operate primary switch 36 in a way that is very simple, has a fixed frequency, and/or has a fixed duty cycle.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A power circuit comprising:
   a transformer arranged to store energy, the transformer including a primary side winding and a secondary side winding;
   an input port coupled to a voltage source;
   a primary switch arranged in series between the primary side winding of the transformer and the input port of the power circuit;
   a parallel switch device arranged in parallel to the secondary side winding of the transformer;
   an output port coupled to a load and arranged in parallel to the secondary side winding of the transformer; and
   a control unit configured to:
   receive, from the load, information indicative of a required voltage level associated with the load; and
   regulate, based on the information, an output voltage at the output port at the required voltage level by at least:
   selecting, based at least in part on the required voltage level, both a first duty cycle for controlling the primary switch, and a second duty cycle for controlling the parallel switch device while the primary switch is open; and
   controlling the primary switch at the first duty cycle during a particular switching cycle and, while the primary switch is open during the particular switching cycle, controlling the parallel switch device at the second duty cycle during the particular switching cycle, wherein controlling the parallel switch device at the second duty cycle during the particular switching cycle causes the parallel switch device to pulse, at the same second duty cycle, multiple times during the particular switching cycle, while the primary switch is open.

2. The power circuit of claim 1,
   wherein the parallel switch device comprises one or more bidirectional blocking switches.

3. The power circuit of claim 2,
   wherein the parallel switch device comprises one or more Gallium Nitride based switch devices.

4. The power circuit of claim 2,
   wherein the one or more bidirectional blocking switches comprise a first blocking switch arranged in series with a second blocking switch, wherein the first blocking switch is configured to block a first voltage at a first terminal of the parallel switch device and the second blocking switch is configured to block a second voltage at a second terminal of the parallel switch device.

5. The power circuit of claim 1,
   wherein the parallel switch device is configured to cause a freewheeling current path at the secondary winding of the transformer when the parallel switch device is closed.

6. The power circuit of claim 1,
   wherein a first terminal of the parallel switch device is coupled to a first terminal of the secondary winding and a second terminal of the parallel switch device is coupled to a second terminal of the secondary winding; and wherein a first terminal of the output port is coupled to the first terminal of the secondary winding and the first terminal of the parallel switch device and a second terminal of the output port is coupled to the second terminal of the secondary winding and the second terminal of the parallel switch device.

7. The power circuit of claim 1,
wherein the primary switch comprises a Gallium Nitride based switch device.

8. The power circuit of claim 1, wherein the input port is coupled to the primary side winding of the transformer; and
wherein the control unit is further configured to cycle the primary switch of the power circuit to build up, based on an input voltage at the input port, the amount of energy stored at the transformer.

9. The power circuit of claim 8,
wherein the control unit is further configured to hold open the parallel switch device when cycling the primary switch.

10. The power circuit of claim 1,
wherein the control unit is further configured to cycle the parallel switch device in response to determining that the load does not satisfy a threshold.

11. The power circuit of claim 10,
wherein the control unit is further configured to hold the parallel switch device open in response to determining that the load satisfies the threshold.

12. The power circuit of claim 10,
wherein the threshold corresponds to a maximum amount of load associated with the power circuit.

13. The power circuit of claim 1, wherein the control unit is further configured to control the parallel switch device by at least:
determining, based on a query of the required voltage from a lookup table, the second duty cycle for controlling the parallel switch device; and
controlling, based on the second duty cycle, the parallel switch device.

14. The power circuit of claim 13, wherein:
the second duty cycle corresponds to a zero percent duty cycle when the required voltage corresponds to the maximum voltage supported by the power circuitry; and
the second duty cycle corresponds to a one hundred percent duty cycle when the required voltage corresponds to a zero voltage level.

15. The power circuit of claim 1, wherein the power circuit is configured as a flyback converter.

16. A method comprising:
receiving, by a control unit of a power circuit, from a load coupled to an output port that is arranged in parallel to a secondary side winding of a transformer of the power circuit, information indicative of a required voltage level associated with the load, wherein the power circuit includes: a primary switch arranged in series between a primary side winding of the transformer and an input port of the power circuit, and a parallel switch device arranged in parallel to the secondary side winding of the transformer; and
regulating, by the control unit, based on the information, an output voltage at the output port at the required voltage level by at least:
selecting, by the control unit, based at least in part on the required voltage level, both a first duty cycle for controlling the primary switch, and a second duty cycle for controlling the parallel switch device while the primary switch is open; and
controlling, by the control unit, the primary switch at the first duty cycle during the particular switching cycle and, while the primary switch is open during the particular switching cycle, controlling, by the control unit, the parallel switch device at the second duty cycle during the particular switching cycle, wherein controlling the parallel switch device at the second duty cycle during the particular switching cycle causes the parallel switch device to pulse, at the same second duty cycle, multiple times during the particular switching cycle, while the primary switch is open.

17. The method of claim 16, further comprising:
controlling, based on the information, the parallel switch device to regulate, based on the amount of energy stored at the transformer, an output current at the output port.

18. The method of claim 16, wherein controlling the primary switch further comprises:
opening the parallel switch device; and
closing the primary switch.

19. The method of claim 16, wherein controlling the parallel switch device further comprises:
closing the parallel switch device; and
opening the primary switch.

20. The method of claim 16, further comprising:
determining an amount of load at the output port, wherein both the first duty cycle and the second duty cycle are further selected based at least in part on the amount of load.

21. The method of claim 20, wherein selecting the first duty cycle and the second duty cycle comprises selecting, using an efficiency algorithm, the first duty cycle and the second duty cycle as a most efficient duty cycle pair for generating the required voltage level at the output port.

22. The method of claim 20, wherein selecting the first duty cycle and the second duty cycle comprises selecting, based on a temperature of the primary switch and a temperature of the parallel switch device, the first duty cycle and the second duty cycle as a most efficient duty cycle pair for generating the required voltage level at the output port.

23. The method of claim 20, wherein selecting the first duty cycle and the second duty cycle comprises selecting, based on a current through the primary switch, the first duty cycle and the second duty cycle as a most efficient duty cycle pair for generating the required voltage level at the output port.

24. The method of claim 20, wherein selecting the first duty cycle and the second duty cycle comprises selecting, based the required voltage level and the output port and the amount of load, the first duty cycle and the second duty cycle as a most efficient duty cycle pair for generating the required voltage level at the output port.

25. The method of claim 16, further comprising:
determining an amount of load at the output port, wherein selecting the first duty cycle and the second duty cycle comprises further selecting, based at least in part on the amount of load, the first duty cycle and the second duty cycle as a most efficient duty cycle pair for generating the required voltage level at the output port.

26. The method of claim 16, further comprising:
controlling both the primary switch and the parallel switch device to reduce the output voltage at the output port, wherein the output voltage is based on a portion of the amount of energy stored at the transformer.

27. The method of claim 16, further comprising:
controlling both the primary switch and the parallel switch device to cause the power circuit to operate in zero voltage frequency operation mode.

28. The method of claim 16,
wherein a first terminal of the parallel switch device is coupled to a first terminal of the secondary winding and a second terminal of the parallel switch device is coupled to a second terminal of the secondary winding; and
wherein a first terminal of the output port is coupled to the first terminal of the secondary winding and the first terminal of the parallel switch device and a second terminal of the output port is coupled to the second terminal of the secondary winding and the second terminal of the parallel switch device.

29. The method of claim 16, wherein the power circuit is configured as a flyback converter.

30. A system comprising:
means for receiving, from a load coupled to an output port of a power circuit that is arranged in parallel to a secondary side winding of a transformer of the system, information indicative of a required voltage level associated with the load, wherein the system includes: a primary switch arranged in series between a primary side winding of the transformer and an input port of the power circuit, and a parallel switch device arranged in parallel to the secondary side winding of the transformer; and
means for regulating, based on the information, an output voltage at the output port at the required voltage level, wherein the means for regulating the output voltage at the output port at the required voltage level comprise:
means for selecting, based at least in part on the required voltage level, both a first duty cycle for controlling the primary switch, and a second duty cycle for controlling the parallel switch while the primary switch is open; and
means for controlling, the primary switch at the first duty cycle during the particular switching cycle and means for controlling, while the primary switch is open during the particular switching cycle, the parallel switch device at the second duty cycle, wherein the means for controlling the parallel switch device at the second duty cycle during the particular switching cycle causes the parallel switch device to pulse, at the same second duty cycle, multiple times during the particular switching cycle, while the primary switch is open.

31. The system of claim 30, further comprising:
means for controlling both the primary switch and the parallel switch device to reduce the output voltage at the output port, wherein the output voltage is based on a portion of the amount of energy stored at the transformer.

32. The system of claim 30, further comprising:
means for controlling both the primary switch and the parallel switch device to cause the power circuit to operate in zero voltage frequency operation mode.

33. The system of claim 30,
wherein a first terminal of the parallel switch device is coupled to a first terminal of the secondary winding and a second terminal of the parallel switch device is coupled to a second terminal of the secondary winding; and
wherein a first terminal of the output port is coupled to the first terminal of the secondary winding and the first terminal of the parallel switch device and a second terminal of the output port is coupled to the second terminal of the secondary winding and the second terminal of the parallel switch device.

34. The system of claim 30, wherein the system is configured as a flyback converter.

\* \* \* \* \*